United States Patent
Kilty et al.

(10) Patent No.: US 9,613,269 B2
(45) Date of Patent: Apr. 4, 2017

(54) IDENTIFYING AND TRACKING CONVECTIVE WEATHER CELLS

(71) Applicant: Honeywell International Inc., Morristown, NJ (US)

(72) Inventors: Brennan Kilty, Cheyenne, WY (US); Paul E. Christianson, Seattle, WA (US); Robert J. Jensen, Renton, WA (US)

(73) Assignee: Honeywell International Inc., Morris Plains, NJ (US)

( * ) Notice: Subject to any disclaimer, the term of this patent is extended or adjusted under 35 U.S.C. 154(b) by 87 days.

(21) Appl. No.: 14/631,585

(22) Filed: Feb. 25, 2015

(65) Prior Publication Data

US 2015/0278596 A1    Oct. 1, 2015

Related U.S. Application Data

(60) Provisional application No. 61/973,113, filed on Mar. 31, 2014.

(51) Int. Cl.
*G06K 9/00* (2006.01)
*G06T 7/00* (2017.01)
(Continued)

(52) U.S. Cl.
CPC ........ *G06K 9/00476* (2013.01); *G01S 13/723* (2013.01); *G01S 13/953* (2013.01);
(Continued)

(58) Field of Classification Search
CPC ... G01S 13/953; G01S 13/89; G06K 9/00476; G06K 9/6202; G01W 1/10; G01W 1/00; G06T 3/00; G06T 7/0079
See application file for complete search history.

(56) References Cited

U.S. PATENT DOCUMENTS 6,184,816 B1    2/2001    Zheng et al.
6,879,280 B1    4/2005    Bull et al.
(Continued)

FOREIGN PATENT DOCUMENTS

EP    2461177 A1    6/2012
WO    9930184 A1    6/1999

OTHER PUBLICATIONS

Response to the Extended Search Report dated Jul. 27, 2015, from counterpart European Application No. 15159423.1, filed Mar. 18, 2016, 13 pp.

(Continued)

*Primary Examiner* — Bhavesh Mehta
*Assistant Examiner* — Ian Lemieux
(74) *Attorney, Agent, or Firm* — Shumaker & Sieffert, P.A.

(57) ABSTRACT

A method for tracking weather cells from a moving platform includes receiving, from a detection and ranging system, reflectivity data sampled for a volume of space and generating a feature map based on the reflectivity data, wherein the feature map is a representation of the volume of space that indicates locations with significant weather and generating a first segmented feature map based on the feature map that identifies the location and spatial extent of individual weather cells. The method further includes translating the first segmented feature map and a second segmented feature map, generated from data collected at a different point in time and/or space, to a common frame of reference and comparing the first segmented feature map to the second segmented feature map. The method further includes creating one or more track hypotheses based on the comparison of the first segmented feature map and the second segmented feature map.

19 Claims, 17 Drawing Sheets

(51) Int. Cl.
*G06K 9/62* (2006.01)
*G06T 3/00* (2006.01)
*G01S 13/72* (2006.01)
*G01S 13/95* (2006.01)

(52) U.S. Cl.
CPC ....... *G06K 9/00624* (2013.01); *G06K 9/6202* (2013.01); *G06K 9/6267* (2013.01); *G06T 3/00* (2013.01); *G06T 7/0079* (2013.01)

(56) References Cited

U.S. PATENT DOCUMENTS

| | | | |
|---|---|---|---|
| 6,882,302 | B1 | 4/2005 | Woodell et al. |
| 7,109,912 | B1 | 9/2006 | Paramore et al. |
| 7,486,220 | B1 | 2/2009 | Kronfeld et al. |
| 7,492,305 | B1 | 2/2009 | Woodell et al. |
| 7,664,601 | B2 | 2/2010 | Daly, Jr. |
| 7,733,264 | B1 | 6/2010 | Woodell et al. |
| 8,319,679 | B2 | 11/2012 | Christianson |
| 2007/0005249 | A1 | 1/2007 | Dupree et al. |
| 2007/0168155 | A1* | 7/2007 | Ravela .................. G01W 1/10 702/179 |

OTHER PUBLICATIONS

Extended Search Report from counterpart European Application No. 15159423.1, dated Jul. 21, 2015, 6 pp.
Johnson, J.T. et al., "The Storm Cell Identification and Tracking Algorithm: An Enhanced WSR-88D Algorithm," Weather and Forecasting, vol. 13, No. 2, Jun. 1998, pp. 263-276.
Matthews, J. et al., "An Improved Storm Cell Identification and Tracking (SCIT) Algorithm based on DBSCAN Clustering and JPDA Tracking Methods," 21st International Lightning Detection Conference, 3rd International Lightning Meteorology Conference, Apr. 19-22, 2010, 21 pp.
Costes, C. et al., "Convective clouds modelling and tracking by an airborne radar," IEEE, OCEANS, Abstract only, Sep. 2008, 2 pp.
Dixon, M. et al., "TITAN: Thunderstorm Identification, Tracking, Analysis, and Nowcasting—A Radar-based Methodology," Journal of Atmospheric and Oceanic Technology, vol. 10, No. 6, Dec. 1993, 13 pp.
Weng, Y. et al., "Assimilating Airborne Doppler Radar Observations with an Ensemble Kalman Filter for Convection-Permitting Hurrican Initialization and Prediction: Katrina (2005)," American Meteorological Society (AMS) Journals Online, Monthly Weather Review, vol. 140, Issue 3, Abstract only, Mar. 2012, 2 pp.

\* cited by examiner

IDENTIFYING AND TRACKING CONVECTIVE WEATHER CELLS

This application claims the benefit of U.S. Provisional Patent Application Ser. No. 61/973,113, filed 31 Mar. 2014, the entire content of which is incorporated herein by reference.

TECHNICAL FIELD

The disclosure relates to weather tracking systems, such as airborne detection and ranging systems.

BACKGROUND

Detection and ranging systems may be used for tracking targets of interest that have fixed structure, such as aircraft, vehicles, landmarks, and animals, as well as targets of interest that do not have fixed structure, such as weather cells, flocks or herds of animals, and formations of vehicle. Weather cells, for example, may occupy a relatively large volume of space, and may be constantly evolving in shape and size, merging with neighboring cells, and splitting into multiple cells.

SUMMARY

Devices, systems, and methods described herein are directed toward tracking objects that are dynamic in shape and size, such as weather cells, from an airborne platform (e.g., an aircraft). For example, the devices and systems described herein may be configured to identify and track weather cells while a platform housing the devices and systems is in flight. An example cell tracking system processes radar samples over time, e.g., once for every new data frame of information, and processes an individual frame of information to identify independent storm cells. The cell tracking system is configured to compare a frame against a previous frame to build track hypotheses. Based on this comparison, the cell tracking system may create tracks.

In one example, a method comprises receiving, by a processor and from a detection and ranging system, reflectivity data sampled for a volume of space. The method further comprises generating, by the processor, a feature map based on the reflectivity data, wherein the feature map is a representation of the volume of space that indicates spatial extent and degree of severity of weather in the volume of interest. The method also comprises generating, by the processor, a first segmented feature map based on the feature map and translating, by the processor, the first segmented feature map and a second segmented feature map to a common frame of reference. The method further comprises comparing, by the processor, the first segmented feature map to the second segmented feature map and creating, by the processor, a track hypothesis based on the comparison of the first segmented feature map and the second segmented feature map.

In another example, a system comprises a detection and ranging system configured to receive reflectivity data and one or more processors communicatively coupled to the detection and ranging system is described. The one or more processors are configured to receive, from the detection and ranging system, the reflectivity data sampled for a volume of space and generate a feature map based on the reflectivity data, wherein the feature map is a two dimensional representation of the volume of space that indicates the spatial extent and degree of severity of weather in the volume under consideration. The one or more processors are further configured to segment the feature map into a first segmented feature map including one or more weather cells and translate the first segmented feature map and a second segmented feature map to a common frame of reference. The one or more processors are further configured to compare the first segmented feature map to the second segmented feature map and create a track hypothesis based on a comparison of the one or more convective cells in the first segmented feature map to one or more convective cells in the second segmented feature map.

In yet another example, a computer-readable storage medium having stored thereon instructions is described. When executed, the instructions cause a processor to receive, from a detection and ranging system, reflectivity data sampled for a volume of space, process the reflectivity data into a feature map, wherein the feature map is a representation of the volume of space that indicates the spatial extent and degree of severity of weather in the volume under consideration, apply a threshold to the feature map to identify weather to be tracked in the feature map, segment the feature map into a first segmented feature map including one or more weather cells, create a cell mask for each of the one or more weather cells in the first segmented feature map, translate the first segmented feature map and a second segmented feature map to a common frame of reference, and overlay the cell masks from the first segmented feature map on cell masks from a second segmented feature map. When executed, the instructions cause a processor to compare the first segmented feature map to the second segmented feature map, generate a track hypothesis based on the comparison of the cell masks from the first segmented feature map to cell masks from the second segmented feature map, store the track history for some of the one or more resulting cell tracks, and trim the track history of some of the one or more cell tracks that are expired.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text, although some variation may exist between the elements.

DETAILED DESCRIPTION

Figure 1:
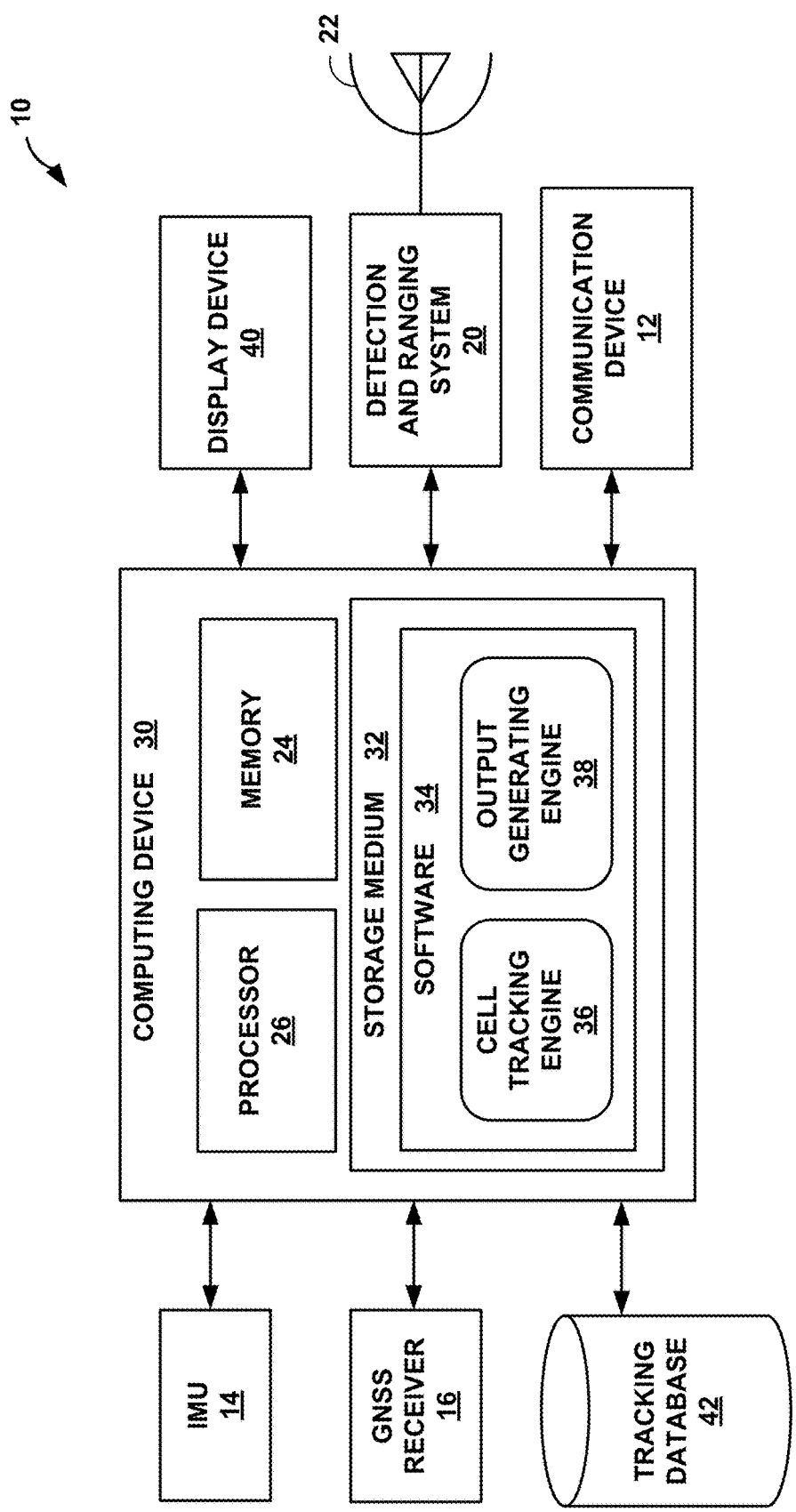
FIG. 1 is a block diagram illustrating an example airborne cell tracking system, in accordance with one or more aspects of the present disclosure.

Techniques, devices, and systems described herein are configured to identify and track weather cells, including convective weather cells. A convective weather cell may be, for example, an area in the atmosphere having a different density than the surrounding atmosphere. Often convective weather cells are precipitating, for example, raining or snowing. Identification of convective weather cells may be useful for one or more purposes, such as to one or more of help forecasters and people proximate to a storm, such as a pilot of an airborne vehicle, to predict where a convective weather cell (also referred to herein as a "storm cell" in some examples) is moving, establish trends as to the growth or decay of the weather cell, determine a top altitude of the weather cell, and determine whether the weather cell has the potential for producing hail, for example.

Ground based radar systems may have an advantage over airborne radar systems when it comes to processing weather radar information to track convective weather cells. For example, relative to airborne radar systems, ground based radar systems may be able to harness greater computational and storage resources that can analyze collected radar information to group radar returns into weather cells and extract the desired features. The radar information may include reflectivity in several dimensions. Due to limited processing power available to airborne radar systems, as well as a rapidly changing look angle that an aircraft (or other airborne platform) can have on a storm cell, existing techniques and systems may not be suitable for airborne radar systems. Techniques, devices, and systems described herein are configured to track weather cells (based on radar information) while in flight, despite limited processing and storage resources available to the airborne radar system, and the changing look angle.

One example convective weather cell tracking technique is as follows. A detection and ranging system, such as a radar system, samples at least part of a volume of space around the system and receives reflectivity data as a return. The radar system may be, for example, airborne and sampling a volume of atmosphere around the radar system. Using the radar return reflectivity that indicates convection cells have been detected, a processor (e.g., of a device onboard the airborne vehicle or of a device on the ground), executing cell tracking software, builds a vertically integrated reflectivity (VIR) feature map.

The feature map may be a two dimensional (2D) representation of the volume sampled by the radar system. The feature map may be broken into a 2D grid of smaller areas (e.g., pixels). Each pixel represents a relatively small portion of the feature map. A feature map may be a spatial representation of objects to be tracked. For example, when tracking convective weather cell locations over time, the feature map shows the spatial extent of convective weather cells at a particular time sample. The feature map has reduced 3D reflectivity to a 2D floating point map that identifies to what degree a pixel in the feature map is a feature of concern (or alternatively a binary map that classifies a particular pixel in the map as being the feature or not). As used herein, a convective weather cell may be one or more pixels that are contiguous with VIR that exceeds the convective classification threshold.

The processor thresholds the VIR feature map because relatively high VIR generally indicates convection to create a classified feature map. For example, the threshold may be chosen by a designer or the processor may dynamically choose the convective classification threshold based on values in the VIR feature map itself. In some examples, convective cells are contiguous areas of the VIR feature map that exceed a convective threshold. In some examples, a user may select the convective threshold based on empirical data that indicates a cell is more likely to be a convective cell when its VIR exceeds a determined value. In some examples, the processor thresholds a feature map based on any aspect having a value greater than a classification threshold.

Next, the processor conditions the classified feature map in order to simplify the map using morphological operators, for example. The processor segments the contiguous pixels from the conditioned feature map and then catalogues the area occupied by the convective cell into a cell masks. A cell mask may be a subset of pixels from the classified feature map that contains the pixels belonging to a particular cell. The processor then translates the segmented feature map (a current frame of reflectivity data taken at a current time step) to have a common frame of reference with a previously segmented feature map. The processor may have segmented the previous segmented feature map (a second frame of reflectivity data taken at a second time step that precedes the current time step) based on the reflectivity data the detection and ranging system previously gathered (for example, during the same flight). In some examples, a cell map may be used instead of cell masks. For example, a cell map may encode the spatial extent of each of the segmented weather cells in a single data structure while a cell mask only encodes the spatial extent of one cell.

The processor uses the segmented feature maps represented by cell masks to correlate cells between two different time samples into cell tracks from one time step to the next. The correlated cells may define a cell track that appears in subsequent frames of reflectivity data, each frame representing reflectivity data for different points in time. In some examples, masks are maintained in a substantially fixed memory size (e.g., the same or nearly the same memory size from one frame to the next), so if a given cell area is larger than the mask can hold, then the cell area is sparsely re-sampled and the mask is generated with the resampled values. In this way, the use of a segmented feature map may help conserve memory and reduce processing load required to track weather cells.

A cell mask may be a data structure that the processor uses to catalog and store the extent of a given storm cell in the feature map reference space. Cell masks may be a memory efficient manner of representing the spatial extent of a storm cell such that it can be stored separate from the other cells in a particular feature map data frame. The processor may also use cell masks to correlate cells that are more than one time-step apart. However, if simply comparing data frames adjacent in time, then encoding the cell identification into the conditioned feature map (e.g. a cell map) much like the grids shown in the FIGS. 8A and 8B can also memory efficient and relatively easy to allocate in memory.

The processor overlays cell masks from the previous data frame (e.g., the second frame of reflectivity data taken at a time step that precedes the current time step) onto cells in a current frame (e.g., the current frame of reflectivity data taken in the current step). The processor compares the overlapping areas (if any) between the two data frames and generates a track hypothesis from the comparison. The track hypothesis a hypothesis as to whether a storm cell or group of cells (e.g., multi-cell) identified in one time sample (i.e., data frame) is related to a storm cell (or multi-cell group of cells) in another time sample. Once a cell track has been established, it may be used to trend changes overtime and extrapolate into the future (e.g., grow, dissipate, intersect a position or path, etc.). The cell masks allow for cells to be tracked as a single cell tracks, multi-cell track groups, or to merge tracks into one track history if two or more cells combine into one larger storm cell. The processor may narrow the track hypothesis for a given cell track to a cell track hypothesis that represents the most likely hypothesis (the most likely hypothesis in some instances could be from the cell mask that had the largest overlap with the cell in the current time sample). The processor may trim weak track hypotheses (e.g., track hypothesis that did not have the most overlap) and expired tracks (e.g., tracks with no overlapping cells in the current frame) from the list of maintained cell tracks. The processor may also create an image based on the track hypotheses that may be outputted for display and or input to a higher level system.

While the remainder of the disclosure primarily refers to a cell tracking system 10 onboard an aerial vehicle, the devices, systems, and techniques described herein may be used with other moveable platforms, such as, but not limited to, ground vehicles, satellites, and the like.

FIG. 1 is a block diagram illustrating an example cell tracking system 10, in accordance with one or more aspects of the present disclosure. As illustrated in FIG. 1, cell tracking system 10 may be a weather tracking system configured to operate onboard an aerial vehicle, such as a piloted aerial vehicle (e.g., a commercial airliner), helicopter, or an autonomous aerial vehicle. Cell tracking system 10 is configured to track convective cells in the airspace around the aerial vehicle across different time instances, which may be from different points of view as the aerial vehicle travels. In some examples, cell tracking system 10 may be located on other objects besides an aerial vehicle, including a satellite or a ground vehicle.

Cell tracking system 10 includes a computing device 30 that performs techniques described herein to track detected cells, such as weather cells, between frames. Computing device 30 can comprise any suitable arrangement of hardware, software, firmware, or any combination thereof, to perform the techniques attributed to computing device 30 and system 10 described herein. For example, computing device 30 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Computing device 30 is configured to receive and analyze reflectivity data (also referred to herein as "radar return data") provided by detection and ranging system 20, the reflectivity data indicating reflections of radar signals in the airspace in one or more directions around cell tracking system 10. Computing device 30 may further perform analysis on additional information from instruments in the cell tracking system 10, such as from one or more of a communication device 12, an inertial measurement unit (IMU) 14, and a global navigation satellite system (GNSS) receiver 16.

In some examples, computing device 30 receives data relating to the location and surroundings of the aerial vehicle (or other platform) on which system 10 is positioned. Computing device 30 may render data for output in a format useful for interpreting, e.g., by a user, the weather in the surrounding environment, such as a visual map. In other examples, cell tracking system 10 does not include any devices or functionality for display, and instead provides tracking data to an external device, or a third party system.

Cell tracking system 10 further includes a detection and ranging system 20. Detection and ranging system 20 may be, for example, a radar system or a LIDAR (light detection and ranging) system. As shown in FIG. 1, detection and ranging system 20 is connected to one or more antennas 22. Detection and ranging system 20 includes any devices and components necessary to perform the remote sensing, as is known to those of skill in the art. Detection and ranging system 20 remotely senses distances to a target (such as an object or terrain) by radiating the target with radio waves and analyzing the resulting backscatter radiation. Detection and ranging system 20 is configured to scan one or more volumes of three dimensional space for objects and provide data related to the distance and bearing of one or more objects and its position within the cell to computing device 30.

For example, detection and ranging system 20 may be configured to output radio waves that may be scattered by precipitation in the atmosphere. Some of this scattered radiation returns to detection and ranging system 20 and is referred to herein as reflectivity data. Reflectivity (referred to as "Z") is an amount of transmitted power returned to a receiver of detection and ranging system 20 after the radiation reflects off precipitation compared to a reference power density at a distance of 1 meter from antenna 22. Reflectivity is measured in dBZ (decibels relative to Z).

Detection and ranging system 20 may sample the environment around cell tracking system 10 (and, therefore, around the platform on which system 20 is placed) at any suitable sample period, such as, but not limited to, relatively continuously. In other examples, detection and ranging system 20 takes reflectivity measurements once every selected time period. For example, detection and ranging system 20 could produce a scan sequence once approximately every thirty seconds. As used herein, the term "scan sequence" refers to one sample period of detection and ranging system 20 (that is, one set of reflectivity data is returned for each scan sequence). The scan sequence may be any reasonable sample period, for example, 1 second to 5 minutes, or other time periods. The scan sequence may be selected based on what targets are being tracked, how quickly the targets evolve, change, and move. Other considerations for the scan sequence period may include speed of system 10, how much granularity is desired to know the position of the targets at a given time, speed and signal to noise ratio of detection and ranging system 20, and the volume to be sampled, for example.

Detection and ranging system 20 may include be any suitable type of system, such as, for example, scanning X or S-band weather radar systems. Various examples of detection and ranging system 20 may use one or more antennas 22, various configurations of the one or more antennas 22, and different frequencies. One or more frequencies used in detection and ranging system 20 may be selected for a desired obstacle resolution and stealth.

Computing device 30 includes a processor 26, a memory 24, and a storage medium 32. Processor 26 implements a cell tracking engine 36 and an output generating engine 38. In the example shown in FIG. 1, cell tracking engine 36 and output generating engine 38 are implemented in software 34 that processor 26 executes. Software 34 includes program instructions that are stored on a suitable storage device or medium 32. Implementing cell tracking engine 36, processor 26 interprets and processes the reflectivity data to track convective cells. Processor 26 may further use data from IMU 14 and GPS receiver 16 to determine a position and orientation of the aerial vehicle. When implementing output generating engine 36, processor 26 may render a 2D or 3D map image from the reflectivity data interpreted by cell tracking engine 36. In some examples, processor 26, while implementing output generating engine 38, provides display device 40 with data related to an image for display that indicates convective weather cells. In other examples, cell tracking system 10 does not include output generating engine 38.

Suitable storage devices or media 32 include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices), magnetic disks (such as local hard disks and removable disks), and optical disks (such as Compact Disk-Read Only Memory (CD-ROM) disks). Moreover, the storage device or media 32 need not be local to cell tracking system 10. In some examples, a portion of software 34 executed by processor 26 and one or more data structures used by software 34 during execution are stored in memory 24. Memory 24 may be, in one implementation of such an example, any suitable form of random access memory (RAM) now known or later developed, such as dynamic random access memory (DRAM). In other examples, other types of memory can be used. The components of computing device 30 are communicatively coupled to one another as needed using suitable interfaces and interconnects.

Cell tracking system 10 may further include a tracking database 42. Tracking database 42 may store, onboard the aerial vehicle, historical VIR or vertically integrated liquid (VIL) data. In some examples, computing device 30 may store, in tracking database 42, historical VIR/VIL data from earlier in a current flight. In further examples, tracking database 42 may store historical VIR/VIL data gathered from a ground station or other aerial vehicle.

As with storage medium 32, memory 24, tracking database 42, and other memories described herein may include any volatile or non-volatile media, such as any combination of RAM, ROM, EPROM, EEPROM, flash memory, and the like.

Cell tracking system 10 may further include one or more communication device 12. Communication device 12 may be any device or system that is configured to communicate with another computing device or communication system external to cell tracking system 10. In some examples, communication device 12 may be a transceiver that is configured to transmit cell tracking data to a ground communication system or another aerial vehicle and receive information from the ground system or aerial vehicle. Communication device 12 may forward data relating to weather to computing device 30. Computing device 30 may in turn apply relevant weather information received at communication device 12 to refine cell tracking.

Cell tracking system 10 may further include an additional ranging system in addition to detection and ranging system 20, such as a secondary radar system, a lidar system, or another type of remote ranging system. A lidar system remotely senses distances to a target (such as an object or terrain) by illuminating a target with a laser and analyzing the reflected light. Any additional ranging system would include any devices and components necessary to perform the remote sensing, as is known to those of skill in the art. The one or more additional ranging systems may also be used to determine other properties besides distance of an object, such as speed, trajectory, altitude, or the like, alone or in combination with the weather cell tracking techniques described herein.

In the example shown in FIG. 1, cell tracking system 10 includes IMU 14, which is configured to determine pitch and roll of cell tracking system 10 and provide data relating to the pitch and roll to computing device 30. Computing device 30 may use the pitch and roll data to determine and correct the position location of the platform including cell tracking system 10. Computing device 30 may also use the pitch and roll data to correlate a point of view of a current feature map with a point of view of a previous feature map in order to translate them to a common frame of reference.

In the example of FIG. 1, IMU 14 is onboard the aerial vehicle. IMU 14 may, therefore, be configured to provide attitude data for the aerial vehicle (that is, IMU 14 may sense the orientation of the aerial vehicle with respect to the terrain). In some examples, IMU 14 includes accelerometers for sensing a linear change in rate (that is, acceleration) along a given axis and gyroscopes for sensing change in angular rate and orientation of the platform (that is, used to determine rotational velocity or angular position). In some examples, IMU 14 provides position information at an approximately uniform rate, such as once every scan sequence, so that processor 26 may translate a current and a previous time stamp cell mask to a common frame of reference. IMU 14 may provide information related to a relative position change from one time sample to the next.

In the example shown in FIG. 1, cell tracking system 10 includes GNSS receiver 16. In some examples, GNSS receiver 16 may be a global positioning system (GPS) receiver. GNSS receiver 16 determines the position of cell tracking system 10 when the satellite network is available. In GNSS denied conditions, GNSS receiver 16 is unable to provide the position of cell tracking system 10, so computing device 30 may use other means of determining the precise location of system 10, such as IMU 14. In some examples, processor 26 may use positioning information from GNSS receiver 16 when translating the current and previous time stamp cell masks to a common frame of reference. In other examples, cell tracking system 10 does not include GNSS receiver 16.

Display device 40 may receive image data related to weather map from computing device 30. For example, computing device 30 may generate a graphical user interface including a map that includes information related to tracked weather cells and display the graphical user interface via display device 40. A user, such as a pilot, may view the weather map output. Display device 40 may be operable to display additional information as well, such as object tracking information, altitude and pitch of the aerial vehicle, pressure, terrain, and the like. Display device 40 may also display information received from a ground station, such as weather information gathered by the ground station or from another aerial vehicle.

Display device 40 can be any device or group of devices for presenting visual information, such as one or more of a digital display, a liquid crystal display (LCD), plasma monitor, cathode ray tube (CRT), an LED display, or the like.

Cell tracking system 10 detects roughly defined objects, such as convective weather cells, and tracks them over time as cell tracking system 10 moves through space. In some examples, cell tracking system 10 uses a vertically integrated reflectivity (VIR) feature space and an empirically chosen classification threshold to identify areas of convectively and a two-dimensional (2D) cell mask to link cells over time into cell tracks. Cell tracking system 10 is configured to apply the threshold to a 2D floating point VIR map (e.g. the feature map) to generate a 2D binary VIR convection map (e.g. the classified feature map). The VIR feature space and the threshold application may help reduce complexity for the cell identification, segmentation, and correlation between time steps, which in turn may reduce computational and memory requirements for convective weather cell tracking compared to many existing methods that look at multiple 2D slices of the reflectivity.

Figure 2:
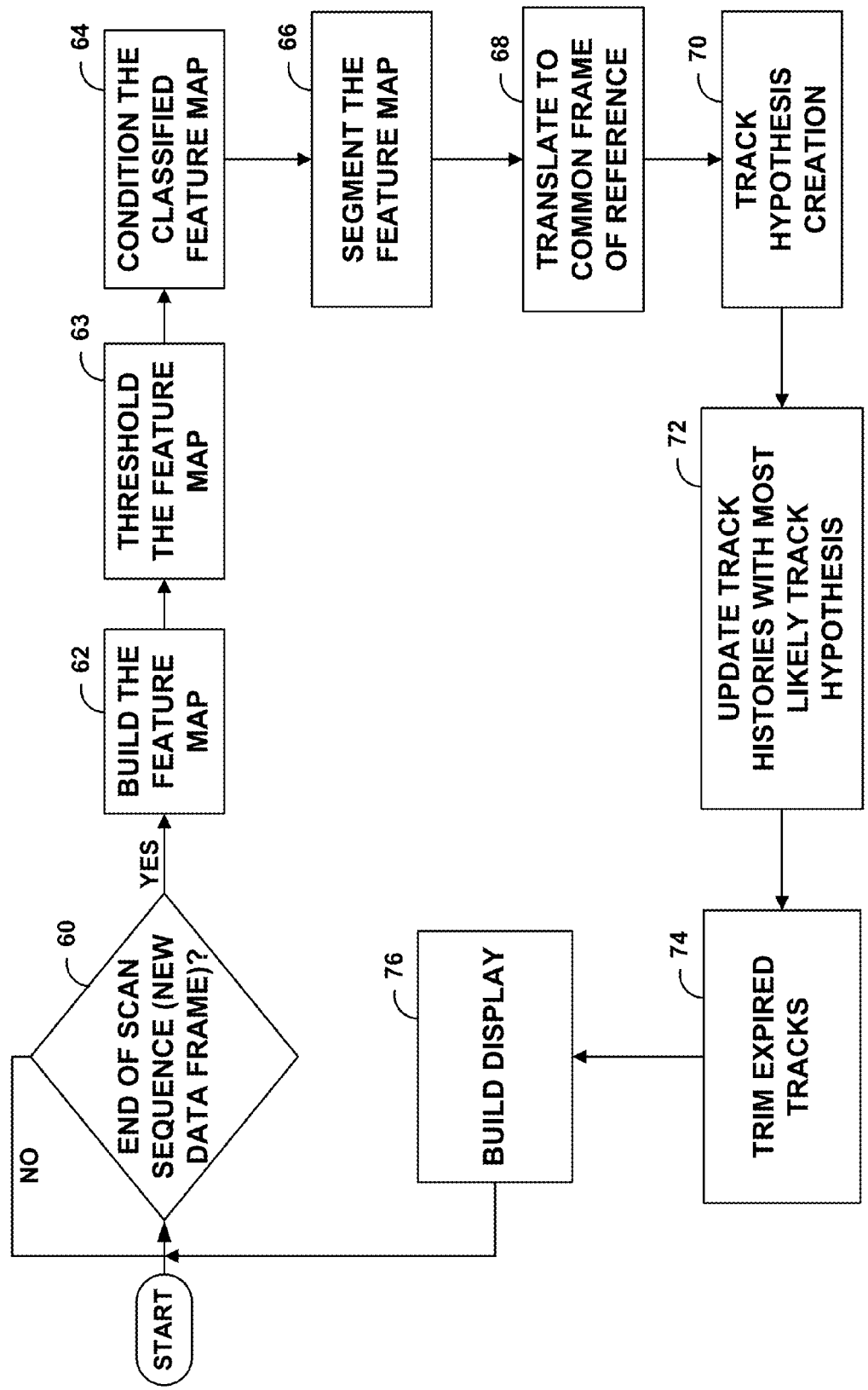
FIG. 2 is a flowchart illustrating an example cell tracking process, in accordance with one or more aspects of the present disclosure.

FIG. 2 is a flowchart illustrating an example cell tracking process, in accordance with one or more aspects of the present disclosure. Systems and devices described herein may implement the cell tracking process described in FIG. 2. For example, cell tracking system 10 may implement the example cell tracking process of FIG. 2 in order to track convective cells over multiple scan sequences. As discussed herein. FIG. 2 will be described with respect to cell tracking system 10 of FIG. 1. However, in other examples, other systems and devices may implement the example process of FIG. 2 to track convective weather cells. In addition, in some examples, system 10 (or another system) implements the technique shown in FIG. 2 a plurality of times, e.g., once for every new data frame of information. Each iteration through the process shown in FIG. 1 may use a different set of radar return data for a respective point in time; the set of radar return data may be referred to herein as a data frame. System 10 may process individual data frames to identify storm cells and then compare the identified storm cells in a current frame to the identified storms cells of a previous frame to build a track.

In accordance with the technique shown in FIG. 2, in response to determining an end of a new scan sequence ("YES" branch of block 60), processor 26 starts a new iteration of the tracking process. A scan sequence is one instance of detection and ranging system 20 scanning at least part of the environment around the aerial vehicle, such as the atmosphere in front of the aerial vehicle, and receiving reflectivity data. An end of scan sequence may occur, for example, every thirty seconds. That is, detection and ranging system 20 collects a new data frame every thirty seconds. In other examples, scan sequences will have different time periods. If it is not the end of a scan sequence ("NO" branch of block 60), processor 26 waits and continues to query whether it is the end of the scan sequence. In another example, processor 26 queries whether it is the end of the scan sequence based on something that indicates the previous scan sequence has ended. Once it is the end of the previous scan sequence ("YES" branch of block 60), processor 26 controls detection and ranging system 20 to begin a new scan sequence to collect the next data frame.

A new scan sequence begins with detection and ranging system 20 collecting a new data frame of reflectivity information. Processor 26, while implementing cell tracking engine 36, builds a new feature map from the reflectivity data (62). For example, processor 26 may take the data frame, including the reflectivity information, and distill it down into a classified feature map. Processor 26 creates a classified feature map by applying a classification threshold to the VIR data to isolate areas of connectivity within the data frame (relating to the atmospheric area detection and ranging system 20 sampled). For example, processor 26 may interpret a cell that has a VIR in excess of the classification threshold as a convective cell. In contrast, processor 26 may interpret a cell that has a VIR equal to or less than the classification threshold as not being a convective cell. The classification threshold may be empirically chosen.

In some examples, processor 26 may build the classified feature map by directly thresholding the reflectivity data directly rather than VIR. In other examples, other ways of collapsing the 3D volumetric buffer of reflectivity values into a 2D feature map is used. For example, a metric may be selected to summarize a given vertical column of the buffer (e.g., maximum reflectivity measured in the column or some sub-segment of the column, average of measured reflectivity measured in the column or some sub-segment of the column, a sum of reflectivity values above the freezing altitude, or the like).

Figure 3:
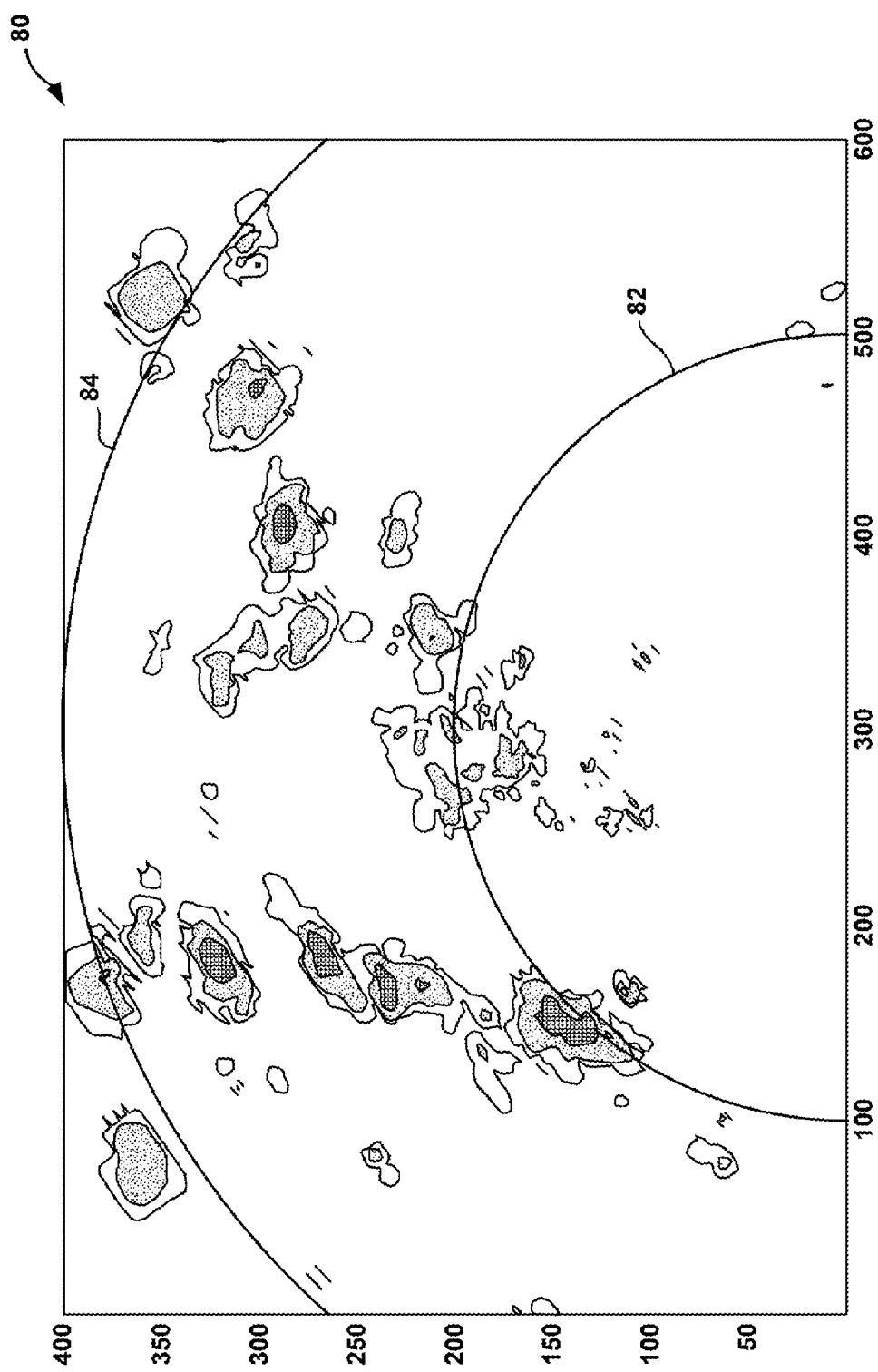
FIG. 3 is a graph illustrating an example composite reflectivity map, in accordance with one or more aspects of the present disclosure.
Figure 4:
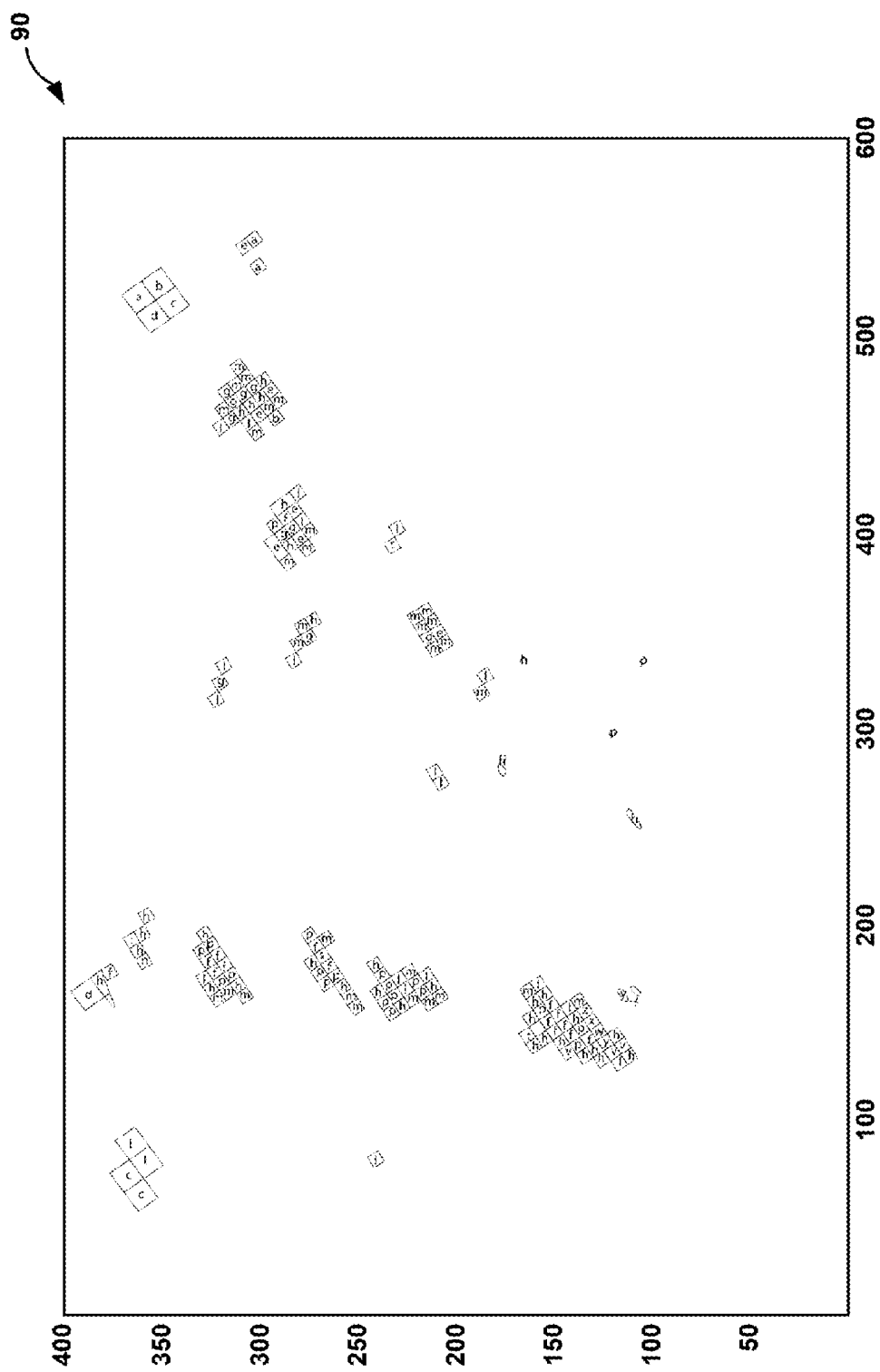
FIG. 4 is a graph illustrating an underlying vertically integrated reflectivity map for graph shown in FIG. 3, in accordance with one or more aspects of the present disclosure.

In some examples, processor 26 may use historical VIR/VIL information stored in tracking database 42 to train or determine the classification threshold that decides whether a VIR value is associated with convection. Turning briefly to FIGS. 3-4, an example composite reflectivity map and its underlying VIR is provided.

FIG. 3 is a graph 80 illustrating an example composite reflectivity map, in accordance with one or more aspects of the present disclosure. Computing device 30 may provide display device 40 with the composite reflectivity map for outputting. In some examples, computing device 30 presents the composite reflectivity map on an aircraft plan view display, such as display device 40, as part of an aircraft radar system display. Thus, graph 80 may be an example of a display that computing device 30 may present to a pilot via display device 40 when an auto weather display mode is selected. Distance rings 82 and 84 represent 80 and 160 nautical miles from the aerial vehicle, respectively. However, in other examples, graph 80 may display different distances from the aerial vehicle.

FIG. 4 is a graph illustrating an underlying VIR map 90 for graph 80 shown in FIG. 3, in accordance with one or more aspects of the present disclosure. In some examples, processor 26 may extract VIR map 90 from the 3D weather buffer. The 3D weather buffer may be a 3D volume of weather reflectivity that is maintained using measurements from detection and ranging system 20. In some examples, the 3D weather buffer has a local earth reference frame that covers a vertical column (e.g., 0-60,000 feet elevation) and up to distances in directions around the aircraft (e.g., 320 nautical miles to front, left, right, and back of the aircraft), with the aircraft approximately representing the center of the weather buffer. As detection and ranging system 20 scans the volume in front of the aircraft, processor 26 populates and updates the volumetric buffer of estimated weather reflectivity. Ground and interference returns may be suppressed in the weather buffer.

VIR map 90 may be floating point 2D VIR map values. Processor 26 may obtain values for the 2D VIR map by integrating (i.e., summing) reflectivity in the vertical dimension, thus transforming a 3D volume into a 2D feature map. The reflectivity values in the 3D buffer are floating point values, so the resulting 2D VIR map may end up with floating point values. FIG. 4 illustrates a pixelated VIR map 90, wherein pixels with similar VIR values would be similarly labeled (e.g. with the same letter or with a same color). For example, pixels with a VIR value within a specified range may be labeled with a certain letter "a" or shown with a certain color.

It should be understood that FIG. 4 is an example that has been manipulated to ease in explanation. In an actual implementation, the pixels shown in FIG. 4 may be significantly smaller and/or oriented differently.

Figure 5:
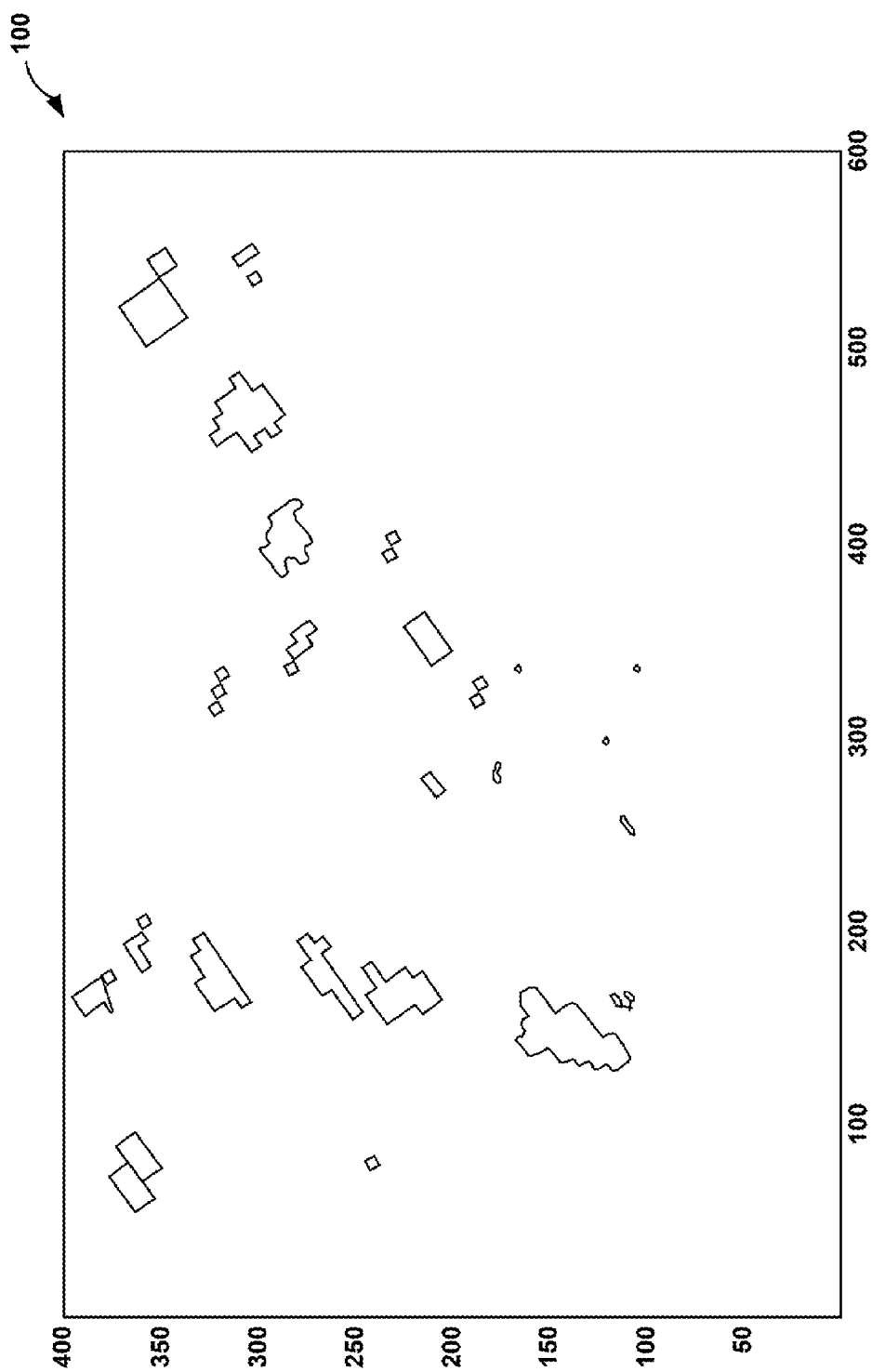
FIG. 5 is a graph illustrating an underlying vertically integrated reflectivity map of FIG. 4 after application of a reflectivity threshold, in accordance with one or more aspects of the present disclosure.

FIG. 5 is a graph illustrating the underlying thresholded VIR map 90 of FIG. 4 (e.g. a classified feature map) after processor 26 applies a classification threshold, in accordance with one or more aspects of the present disclosure. Processor 26 generates 2D binary VIR map 100 by interpreting the reflectivity data from detection and ranging system 20 of a sampled volume to a VIR 2D map corresponding to that volume and then applying a threshold to classify the pixels as convective or not convective (63). At this point in the process, processor 26 converts the feature map from a representation of the degree of severity of the weather to a classification of the weather as either convective or not convective by applying the threshold. 2D binary VIR map 100 is an example of a classified feature map. Only those pixels which exceed the threshold are considered convective pixels. Thus, using the VIR feature space reduces the segmentation space from a 3D floating point reflectivity buffer to a 2D floating point VIR map and then thresholding further reduces the feature space to a 2D binary map.

Returning to FIG. 2, the process continues with conditioning the classified feature map (64). Processor 26 may condition the classified feature map to help simplify it such that it is easier to isolate and segment the individual convective weather cells. To condition the classified feature map, processor 26, while implementing cell tracking engine 36, may apply one or more of feature smoothing, shape generalization, and decluttering to the unconditioned 2D floating point VIR map, such as VIR map 90 of FIG. 4. Simplifying the classified feature map may remove small, inconsequential storms (that are not considered to amount to convective weather cells) from the classified feature map and/or remove complex features on a particular cell. Conditioning the classified feature map may provide more generalized tracking. For example, cell tracking engine 36 may apply a 2D spatial filter over the classified feature map. The 2D spatial filter may smooth the edges and remove high frequency shape content.

In some examples, processor 26, while implementing cell tracking engine 36, may condition the classified feature map by applying one or more filters. In some examples, processor 26 applies a morphological filter to the 2D binary VIR map to condition the map. Processor 26 may apply the morphological filter sparsely in some examples. A sparsely applied filter may be applied to less than an entire data set or frame. For example, processor 26 may not apply the morphological filter to every cell or pixel in the classified feature map, but to a subset of pixels. The subset of pixels that processor 26 sparsely applies the morphological filter to may be based on a selected pattern. In additional examples, processor 26 may apply a sparse filter to the 2D binary VIR map. As described herein, a 2D binary VIR map may be a thresholded VIR feature map while a 2D floating point VIR map may not be thresholded. In some examples, processor 26 applies a morphological filter and uses a look-up table to do so, which may be stored in a database onboard the aerial vehicle or as a part of program memory, such as part of tracking database 42.

In some examples, processor 26 may apply a spatial image filter as follows. An image may comprise a 2D grid of pixels. Processor 26 may apply a spatial image filter on image spaces that exceed 2D. For example, the feature maps described herein can have a third dimension (e.g., time), however, processor 26 could apply the spatial image filter to 3D space or beyond to some hyper-dimensional feature space and the additional dimension of time.

For example, an image to be operated on may consist of a grid of pixels in a 2D Euclidean space, the image having dimensions X and Y. Processor 26 can assign x-axis and y-axis coordinates to pixels of the image. For example, each pixel in the image may have a corresponding (x, y) location where $1 \leq x \leq X$ and $1 \leq y \leq Y$. A kernel may generally be smaller than the image being operated on. Application of a filter by processor 26 in the spatial domain may be a computationally expensive operation. In one example, a straight forward method of applying the kernel includes a number of operations that is approximately $X*Y*(M*N)^2$, wherein M and N are dimensions of the kernel being applied. The operations can be a combination of multiply, divide, compare, and, or, add, exclusive or, as well as others operations, which may depend on the filtering type.

In some examples, processor 26 applies linear filtering operations (e.g., convolving the kernel and image) in the frequency domain by translating both the image and the filter to the frequency domain and then executing a point-by-point multiply. This may significantly reduce the number of computations necessary. However, some non-linear operations do not have an equivalent operation in the frequency domain.

One example method of applying a kernel in the spatial domain includes processor 26, while implementing cell tracking engine 36, placing the center of the kernel on an x, y location in the image. Processor 26 may perform a mathematical operation on every pixel on the image that overlaps the kernel. Processor 26 may combine the results to determine the filtered value of the new image at location x, y.

In another example, processor 26, while implementing cell tracking engine 36, performs binary morphological filtering to the classified feature map. For example, processor 26 may apply a binary kernel in the spatial domain to a binary image. This may be a non-linear operator that has no frequency domain equivalent. A morphological structuring element may be a binary kernel (or mask) that allows processor 26 to define arbitrary neighborhood structures that operate on a binary image. As used herein, a neighborhood is a collection of adjacent (i.e., neighboring) pixels.

Figure 6:
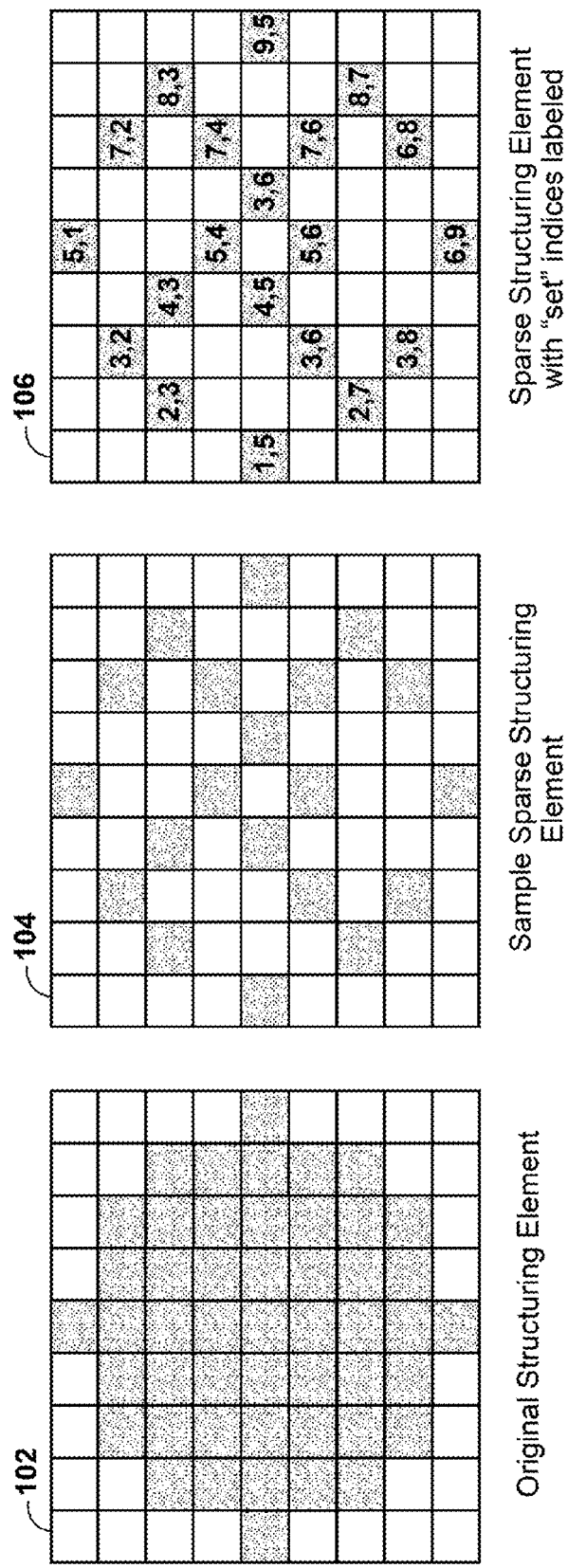
FIG. 6 is a diagram illustrating example sparse structuring element and index arrays for sparse morphological filtering, in accordance with one or more aspects of the present disclosure.

FIG. 6 is a diagram illustrating example sparse structuring element and index arrays that processor 26 may implement to apply sparse morphological filtering, in accordance with one or more aspects of the present disclosure. Using the spare morphological filter allows processor 26, e.g., while implementing cell tracking engine 36, to reduce the number of operations and still achieve a useful morphological effect. In one example, processor 26, while implementing cell tracking engine 36, determines a sparsely set structuring element that produces approximately the same result when applied. FIG. 6 illustrates an original structuring element 102, a sample sparse structuring element 104, and a sparse structuring element with "set" indices labeled.

For example, processor 26 can generate a random or pseudo random sequence to select "set" pixels or visually select sparse pixels to be "set." Processor 26 may only examine pixels that are "set" in the kernel operator (i.e., create an array that contains the indices of the sparse structuring element that are set). As a result, in this example, instead of checking 81 different pixel locations for each image pixel to apply this filter, processor 26 only has to check 20 different pixel locations. Note that the resulting image may not be identical to the original image that processor 26 applied the filter to, and how different they are will depend on how sparse the new element is. However, in many applications, the difference will be insignificant while the processing load for computing device 30 will be significantly reduced.

In some examples, processor 26, while implementing cell tracking engine 36, may use different types of morphological operations when applying the structure element. For example, "dilating" a binary image by processor 26 can fill in gaps and valleys, and may grow and smooth edges of binary image features. In another example, "eroding" a binary image by processor 26 may eliminate relatively small isolated structures, remove peninsula like structures from identified convective cells, break weakly connected elements, and smooth binary image features that may exaggerate openings in shapes.

In some examples, processor 26 does not examine all of the structure pixel overlaps to determine a filtered value. For example, in some examples of dilation, when applying the structuring element, if a set pixel in the structuring element intersects a set image pixel, then processor 26 sets the image pixel under consideration and moves on to the next image pixel. As another example, in some examples erosion, when applying the structuring element, if a "not set" or zero value pixel intersects a "set" pixel in the structuring element, then processor 26 sets the image pixel under examination to a zero and move on to the next image pixel.

An image may also be opened or closed. "Closing" a binary image (by processor 26) may fill in at least some gaps and valleys, and may help smooth edges of some binary image features. The gaps, valleys, and rough edges may result from dilating and then eroding the image. "Opening" a binary image (by processor 26) may eliminate relatively small isolated structures, knocks off peninsula like structures, breaks weakly connected elements, and smooth binary image features exaggerates openings in shapes. Opening may result from eroding and then dilating the image while closing results from dilating and then eroding.

Figure 7A:
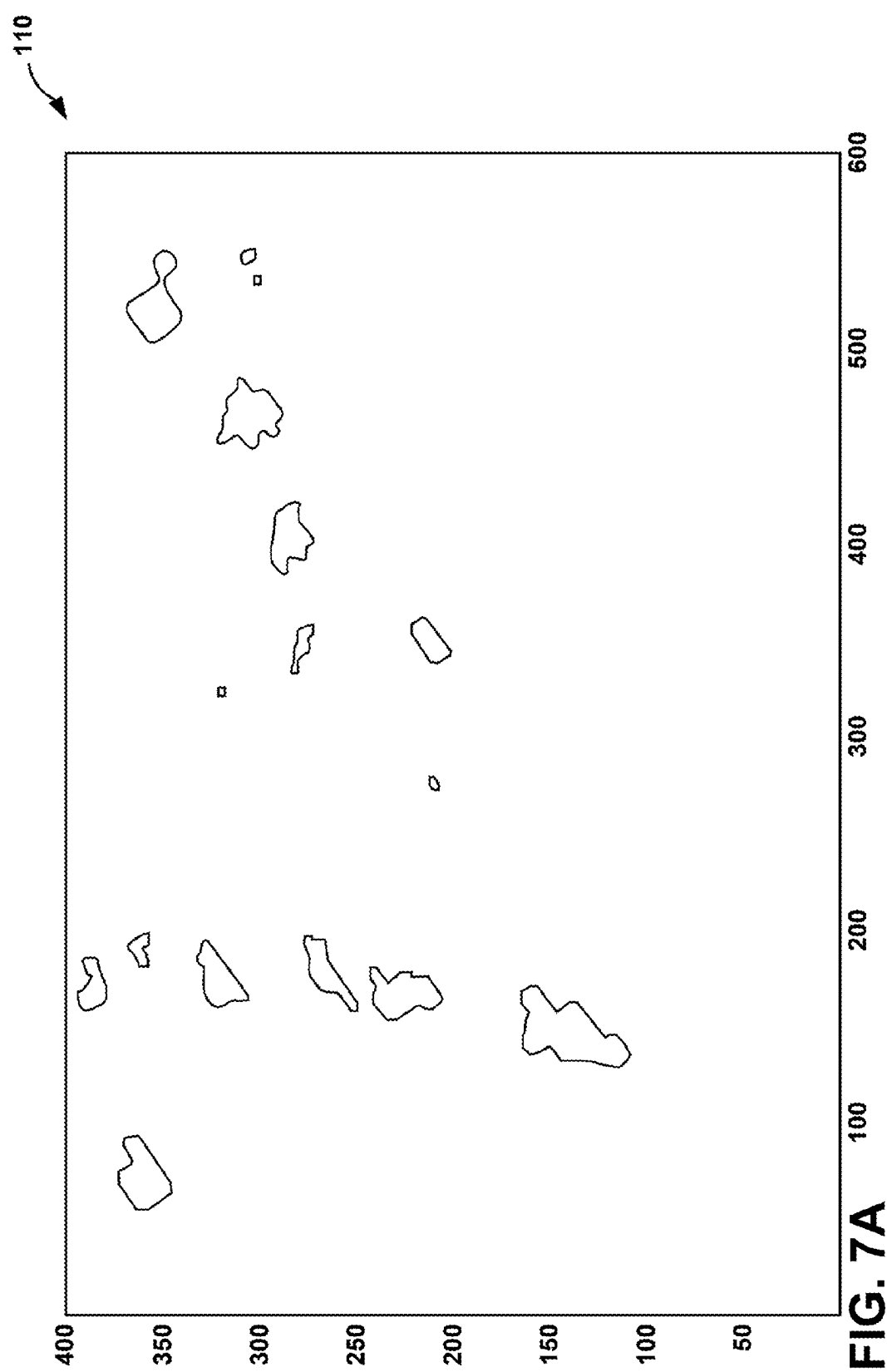
FIG. 7A is a graph illustrating a conditioned 2D binary VIR map generated from the 2D binary VIR map of FIG. 5 after application of filters, in accordance with one or more aspects of the present disclosure.

FIG. 7A is a graph illustrating a conditioned 2D binary VIR map 110 generated by processor 26 from the 2D binary VIR map 100 of FIG. 5 after application of filters, in accordance with one or more aspects of the present disclosure. For example, processor 26, while implementing cell tracking engine 36, may create conditioned 2D binary VIR map 110 by applying sparse morphological operators to 2D binary VIR map 100. The transition from 2D binary VIR map 100 shown in FIG. 5 to conditioned 2D binary VIR map 110 illustrates an example of how conditioning can simplify the boundaries of the cells. Thus, in one example, processor 26 conditions a classified feature map by running a 2D spatial filter over the edges and removing high frequency content. Conditioning the classified feature map makes the cells into smoother blobs, which may make the tracking of convective weather cells by processor 26 more generalized and robust to changes in weather cell shape from one time step to the next. From one frame to the next, the exterior boundaries of the cell may change in shape, but it is less likely that the overall generalized shape will change that much. This may be due, for example, to the nature of convective weather patterns.

Figure 7B:
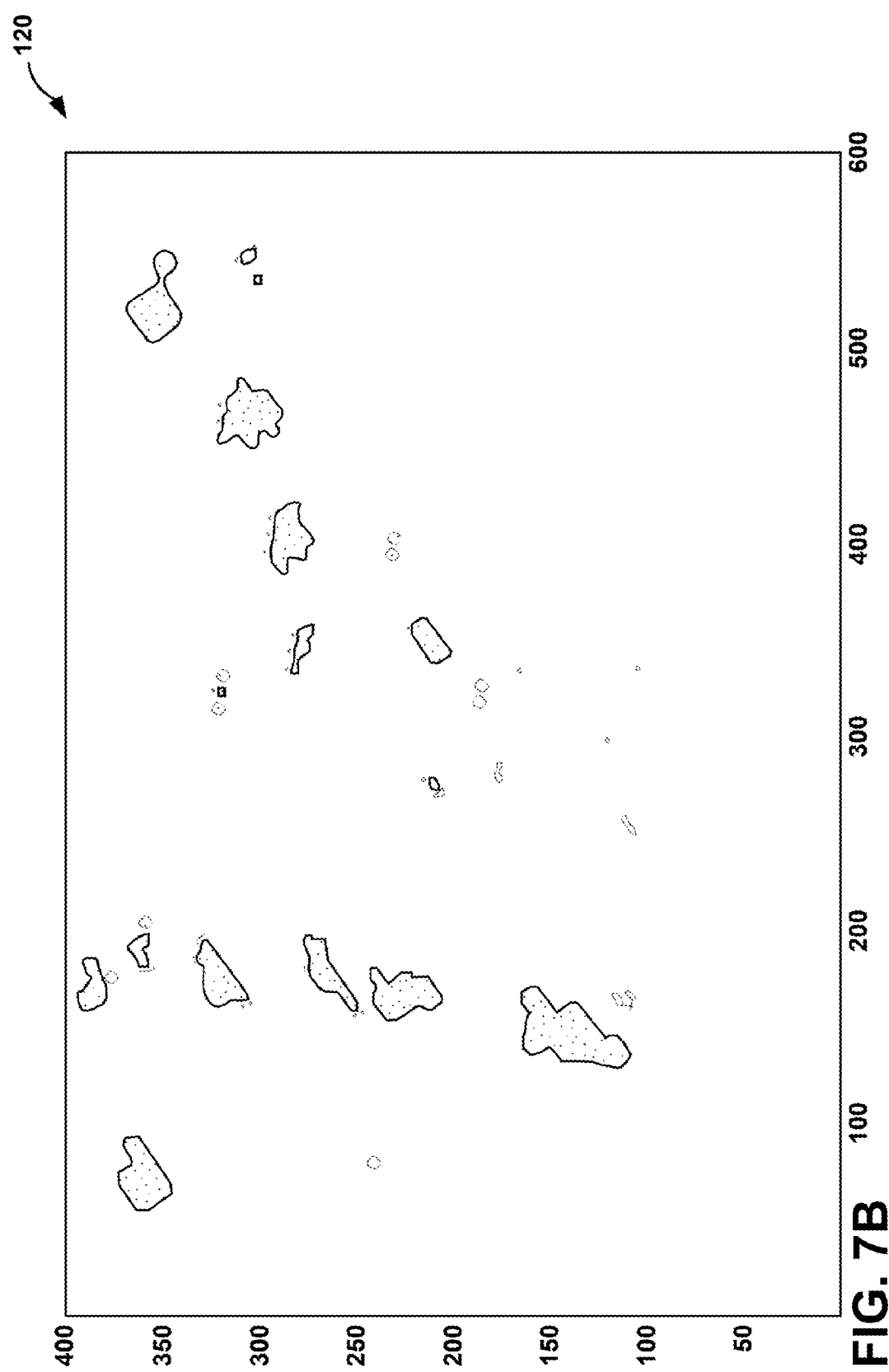
FIG. 7B is a graph illustrating the conditioned 2D binary VIR map of FIG. 7A superimposed on underlying vertically integrated reflectivity map of FIG. 4, in accordance with one or more aspects of the present disclosure.

FIG. 7B is a graph 120 illustrating the conditioned 2D binary VIR map 110 of FIG. 7A superimposed on underlying vertically integrated reflectivity map 90 of FIG. 4, in accordance with one or more aspects of the present disclosure. Processor 26, while implementing cell tracking engine 36, may sum the 2D floating point VIR values inside the conditioned outlines of conditioned 2D binary VIR map 110 for cataloging cell mass and calculating a location of the weighted VIR centroid (i.e., central measure of cell location) to be stored in a cell history (e.g., in memory 24 or tracking database 42 shown in FIG. 1) once the cell is associated with a track. Processor 26 associates a cell with a track when the cell appears in two or more data frames. The storm cell mass may be cataloged for a cell track history and/or stored in memory 24. In one example, processor 26 catalogues the cell mass as part of adding the storm cell to a cell track history.

In some examples, processor 26, while implementing example techniques described herein, may condition the classified feature map 120 using morphological operators to simplify cell boundary features and eliminate cells that may be considered, by processor 26, to be too small to be of consequence. This may help simplify the tracking complexity and reduce overall computational load required to track convective weather cells over time. Straightforward application of morphological operators can be computationally expensive, so processor 26 may implement efficient algorithms and sparse operators to approximate the desired conditioning.

Returning to FIG. 2, processor 26 segments the conditioned feature map, such as conditioned 2D binary VIR map 110 of FIG. 7A, into contiguous groups of pixels that represent convective weather cells (66). For example, the conditioned feature map is segmented into independent weather cells. Processor 26, while implementing cell tracking engine 36, may segment conditioned 2D binary VIR map 110 into cells and as a result, populate cell history data structures stored in tracking database 42. In one example, processor 26 searches through conditioned 2D binary VIR map 110 to group contiguous pixels. In some examples, processor 26 applies different groups together contiguous pixels that have VIR values within a specific range. In an example with a black and white image, cell tracking engine 36 groups all the pixels that are white and proximate to each other as one entity.

Segmenting the feature map may catalog each cell as individual entity to be tracked. Once processor 26 has grouped those pixels that belong together, processor 26 calculates one or more variables for each of the independent grouped entities, referred to herein as "storm cells" or "convective cells." As used herein, convective cells are contiguous areas of a binary VIR map that exceed a classification threshold. Processor 26 may segment contiguous cells from a 2D binary VIR map (e.g. a classified feature map), and catalog the area occupied by the convective cell in a cell mask. Information stored into the cell history data structure of tracking database 42 may include information regarding detected convective weather cells, including, but not limited to, cell masks, VIR weighted centroid location, cell area, cell mass, echo top heights for the cell, whether the cell is classified as a hail or lighting risk, current frame cell identification (ID), and other VIR or reflectivity characteristics of the cell that may be used for trending. Processor 26 may use this information later to track the convective cells.

Segmenting the classified feature map may be a relatively straightforward process in which processor 26 identifies contiguous groups of "set" or pixels with a value of "1" in the 2D binary VIR cell map as independent weather cells. In some examples, once cells have been identified, processor 26, while implementing engine 36, may change the 2D binary VIR Map into a multi-bit cell map and encode the cell ID (cell number in the current frame) in the pixel values of the cell's constituent pixels. In some examples, the number of bits used to represent a pixel determines the maximum number of storm cells that can be tracked in a particular scene. For example, 8-bits equals 256 storm cells.

The cell masks that processor 26 creates may be used to correlate cells into cell tracks from one time step to the next. Masks may be maintained in a fixed memory size in tracking database 42 or memory 24, so if a given cell area is larger than the mask can hold, processor 26 can sparsely re-sample the cell area and generate an updated mask with the resampled values. This approach may conserve memory and reduce processing loads on processor 26.

Figure 7C:
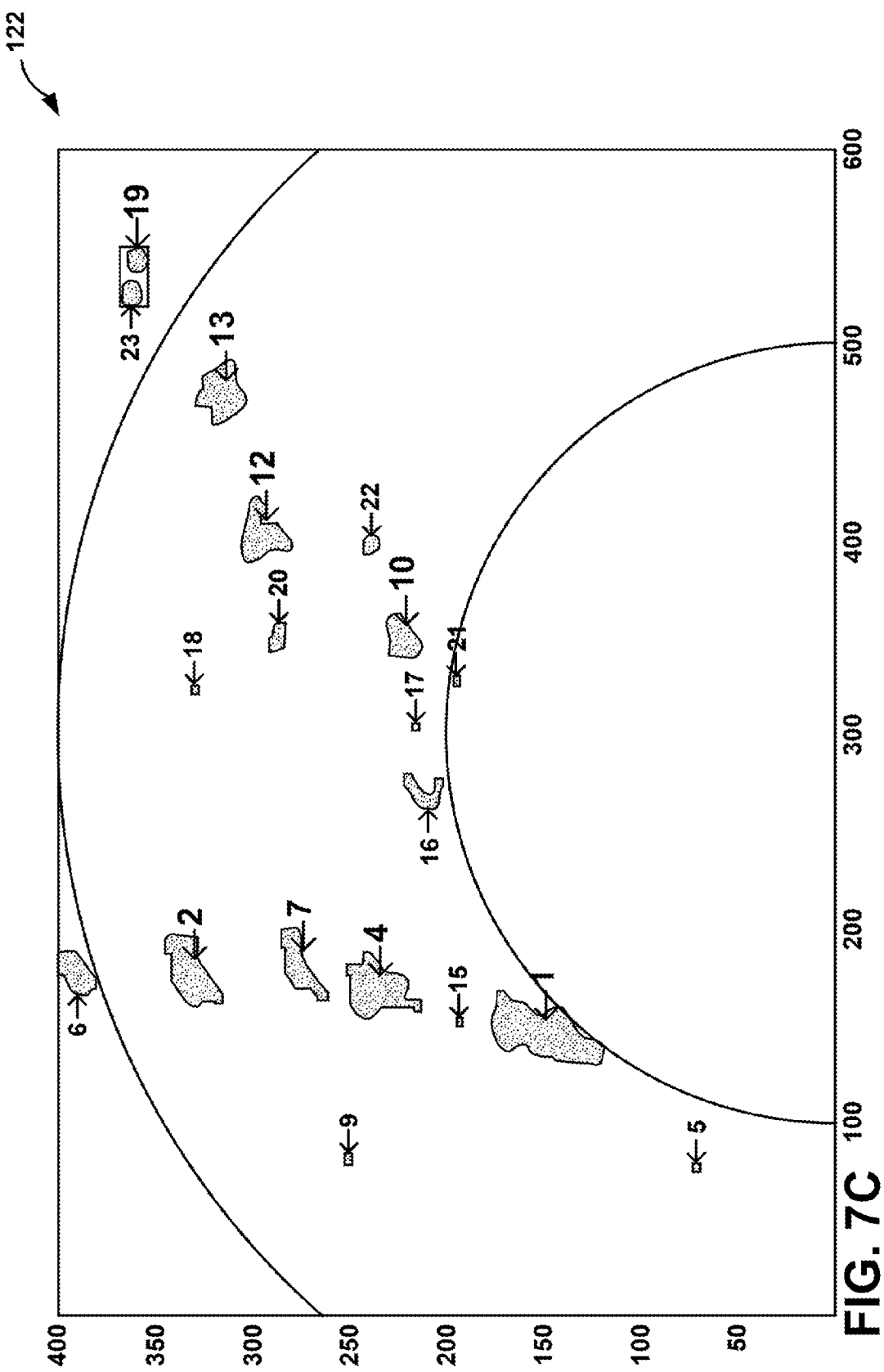
FIG. 7C is a graph illustrating the conditioned 2D binary VIR map of FIG. 7B with track identifications labeled, in accordance with one or more aspects of the present disclosure.

FIG. 7C is a graph illustrating the conditioned 2D binary VIR map of FIG. 7B with cell identifications labeled 122, in accordance with one or more aspects of the present disclosure. In this example, the feature map has been segmented and the convective cells have been assigned identification numbers.

Next, processor 26, while implementing cell tracking engine 36, translates the current and previous time step cell masks to a common frame of reference (68). Over time, as the aerial vehicle moves, each frame of reflectivity data may have its origin in a different location. In some examples, in order to translate the current and previous frames of data to a common frame of reference, processor 26 translates the X-Y coordinates of each one of the images into a common reference frame. Processor 26 may use any suitable mathematical operations to translate and rotate the different images. The frame of reference may, for example, refer to the previous time step cell mask. In another example, the frame of reference may refer to the current time step cell mask. In another example, the frame of reference may be, for example, an external frame of reference such as latitude and longitude. Translation of the image from one data frame to the next may help compensate for any change in position, rotation, and heading of the aerial vehicle.

Figure 8A:
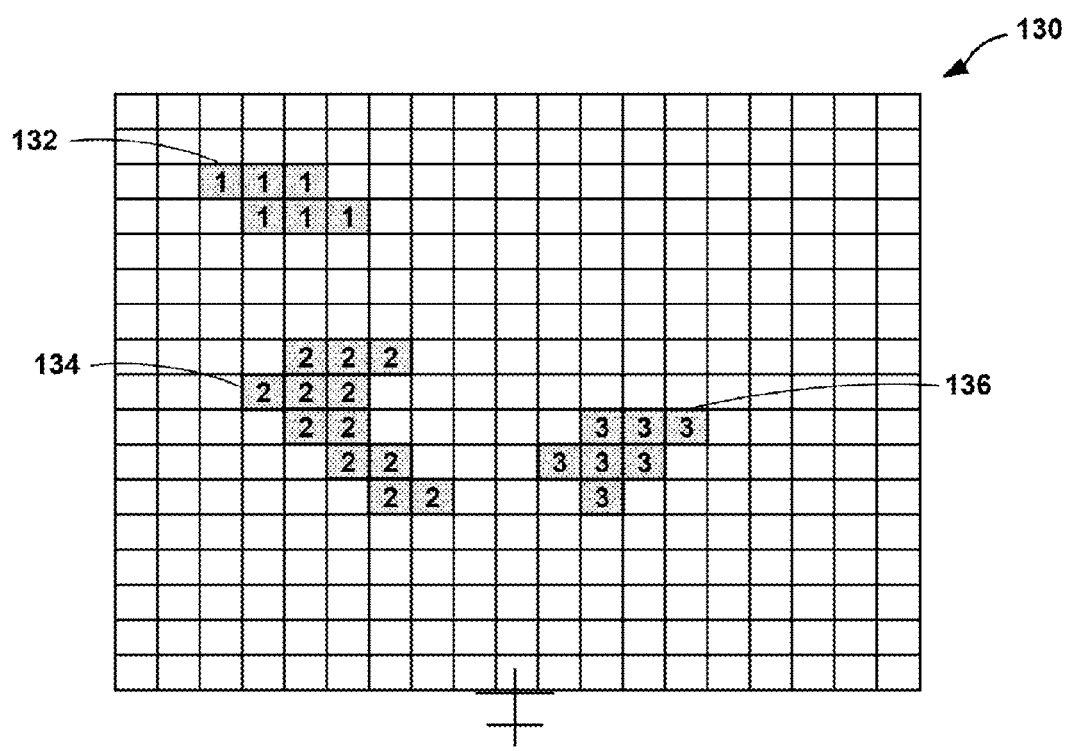
FIG. 8A is a graph illustrating an example cell map with cell identifications (IDs) encoded, in accordance with one or more aspects of the present disclosure.

FIG. 8A is a graph illustrating an example cell map with cell identifications (IDs) encoded, in accordance with one or more aspects of the present disclosure. Cell map 130 includes three contiguous cells, each with a cell ID. The contiguous cells are storm cell 132 (indicated with ID number 1), storm cell 134 (indicated with ID number 2), and storm cell 136 (indicated with ID number 3).

Figure 8B:
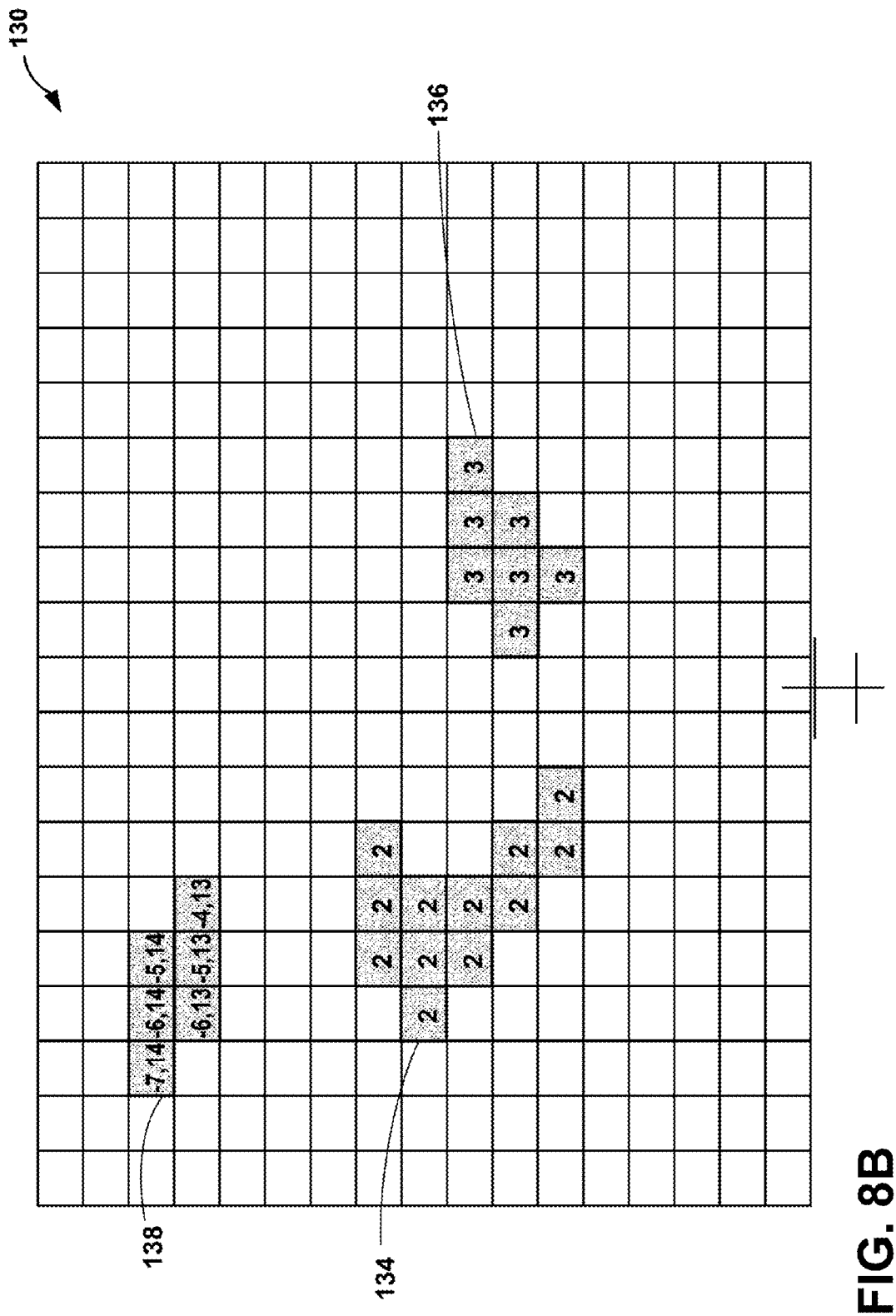
FIG. 8B is a graph illustrating the example cell map of FIG. 8A with a cell mask array, in accordance with one or more aspects of the present disclosure.

FIG. 8B is a graph illustrating the example cell map 130 of FIG. 8A with a cell mask array 138, in accordance with one or more aspects of the present disclosure. In some examples, processor 26 may create a cell mask array, such as cell mask array 138, to track of a cell's extent. In some examples, processor 26 maintains the cell mask arrays at a substantially fixed size (e.g., a fixed size or a nearly fixed size) in order to help avoid dynamic memory allocation. Processor 26, while implementing cell tracking engine 36, may keep track of the segments that make up the cell by tracking cell mask information (e.g., column number, segment start point, and segment end point). For example, for a given segment (e.g., a contiguous group of pixels in a single column of the classified feature map that is being segmented into weather cells), can be described with three numbers. The index of the column that the segment lies in, the index row that represents the first pixel in the contiguous group in the given column, and the index row that represents the last pixel in the contiguous group in the given column. Tracking cells using cell mask arrays may be more efficient (for processor 26) for larger convective weather cells. In the example of FIG. 8B, cell mask array 138 for cell 1 includes twelve integers to track the pixels that make up the cell, which in this case, is nearly the same amount of information as would be required to simply track indices. As a result, the method for cataloging the storm cell extent may consider the number of pixels in a typical storm in order to utilize memory efficiently.

In some examples, processor 26 applies cells masks of a fixed number of segments, or cells masks having a predetermined maximum number of segments, in order to help limit the memory needed to track cells using the cell masks. For example, in one example implementation, processor 26 may store up to only twenty segments in a cell mask. In this example, if the number of segments that make up a cell exceeds twenty, then processor 26, while implementing cell tracking engine 36, may sparsely sample the segments such that the number of stored segments is twenty, but those segments may still roughly represent the extent of the cell to which they correspond. This sparsely sampling technique may be similar to that used for the sparse morphological structuring elements. In some examples, processor 26 determines a re-sample rate by dividing the number of segments in a cell by the fixed number of segments that can be tracked in the cell mask. In other examples, other numbers of segments or ways of reducing the number of segments may be used.

Registering segmented feature maps from one time frame to the next time frame will now be discussed. Processor 26, implementing cell tracking engine 36, uses aircraft data to register segmented feature maps taken at different time frames so that they overlap each other. For example, processor 26 may determine a translation matrix and then overlay one or more cell masks (e.g., a subset of pixels from the segmented feature map that contains the pixels belonging to a particular cell).

Each frame may have an origin related to the position of the aerial vehicle. As the aerial vehicle moves, the viewpoint of detection and ranging system 20 changes, resulting in a change to a viewpoint of the data frames. The origin of the data frames may be at the aerial vehicle's location. In some examples, the aerial vehicle may be located at the bottom center of the image of the data frame. However, in other examples, the origin is at a different location in the image of the data frame.

Figure 9A:
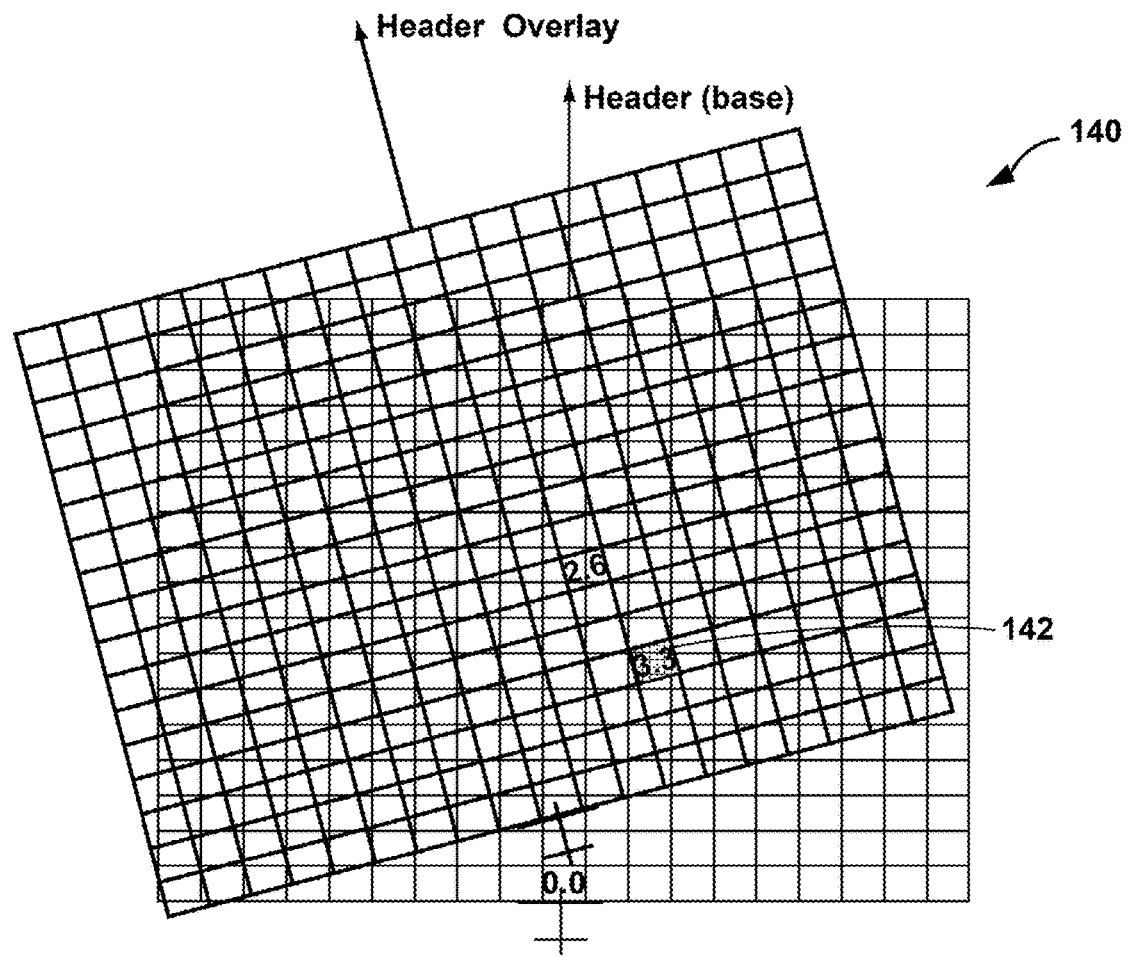
FIGS. 9A and 9B are graphs illustrating an image overlay for cell tracking, in accordance with one or more aspects of the present disclosure.
Figure 9B:
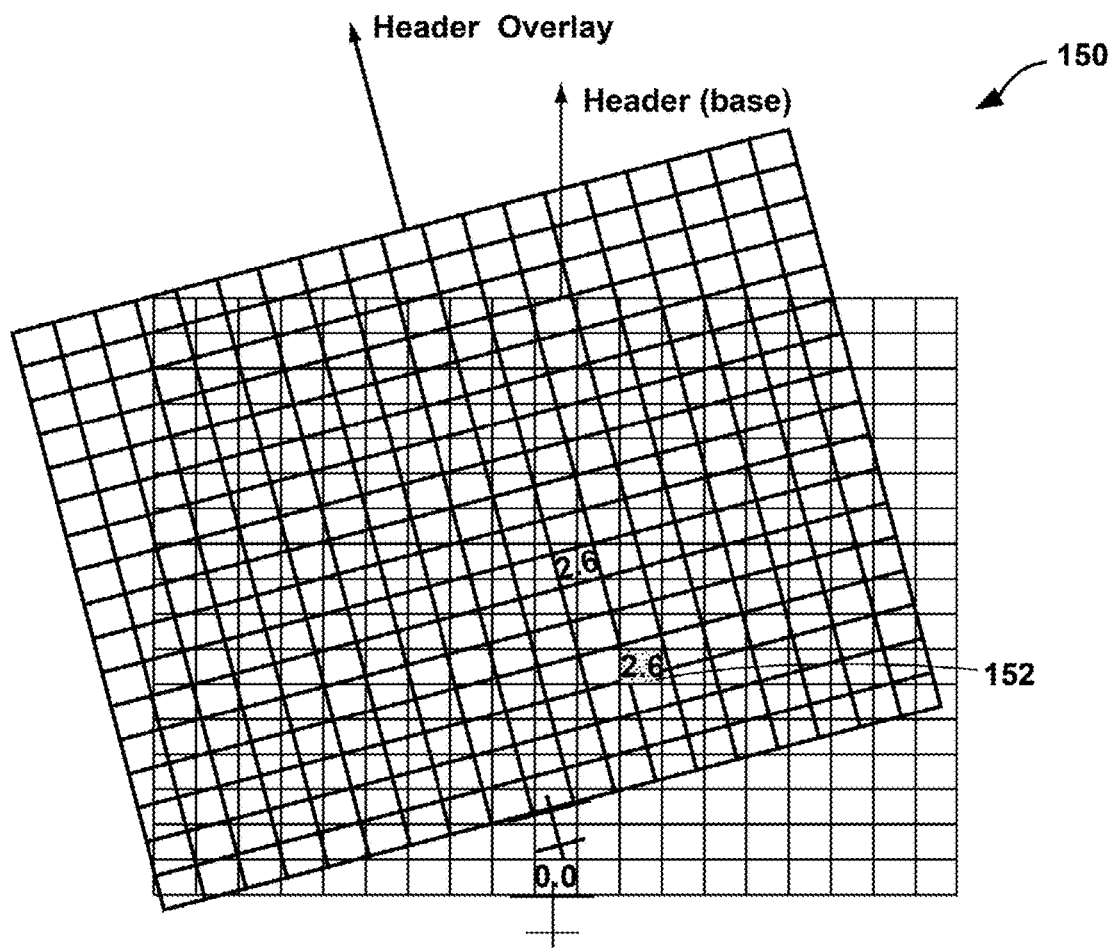

FIGS. 9A and 9B are graphs illustrating an image overlay for cell tracking, in accordance with one or more aspects of the present disclosure. FIG. 9A provides an overlay image 140 and FIG. 9B provides a base image 150. In overlay image 140, the index 142 (index value (3, 3)) corresponds to index 152 (index value (2, 6)) in base image 150.

Processor 26 may use a translation matrix to translate an overlay image (e.g., a first segmented feature map) onto a base image (e.g., a second segmented feature map originating at a time earlier than the first segmented feature map). In one example, processor 26 finds a location $[x_B, y_B]$ in a base image that corresponds to a location $[x_O, y_O]$ in an image to be overlaid. An example translation matrix is provided in Equation 1.

$$\begin{bmatrix} x_B \\ y_B \end{bmatrix} = A \begin{bmatrix} x_O \\ y_O \end{bmatrix} + T \quad (1)$$

Figure 10B:
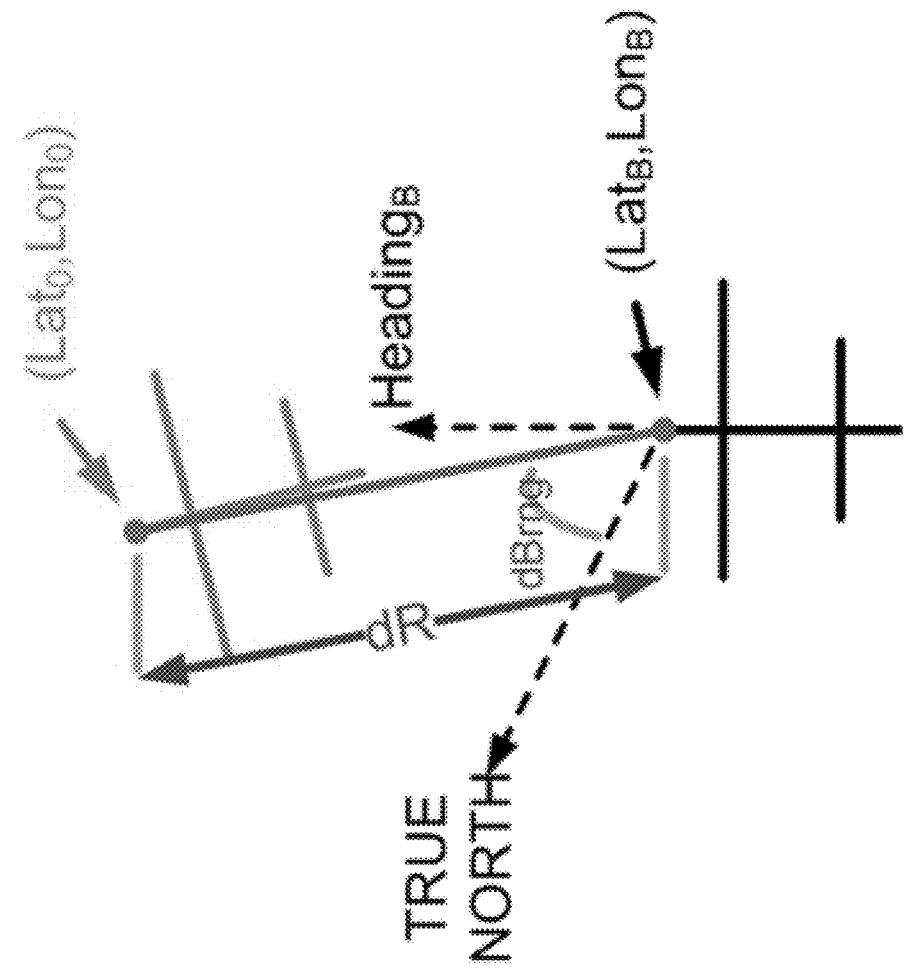
FIG. 10B is a conceptual diagram illustrating a distance between a first location of an aerial vehicle at a base time ($Lat_B$, $Lon_B$) and a second location of the aerial vehicle ($Lat_O$, $Lon_O$), in accordance with one or more aspects of the present disclosure.
Figure 10A:
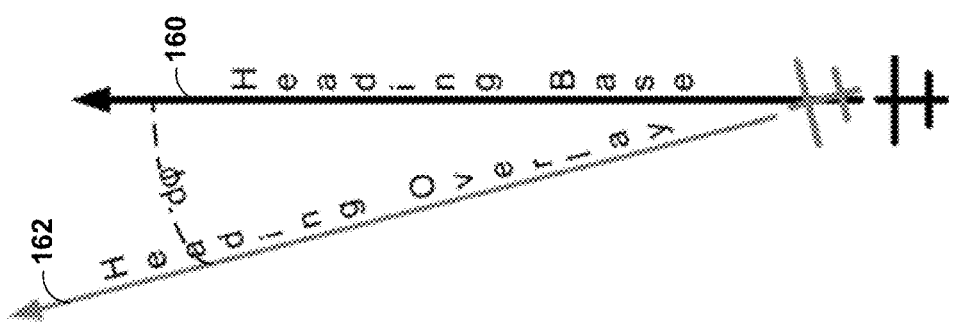
FIG. 10A is a conceptual diagram illustrating an angle between a first heading of an aerial vehicle at a base time and a second heading of the aerial vehicle at an overlay time, in accordance with one or more aspects of the present disclosure.

FIG. 10A is a conceptual diagram illustrating an angle between a first heading of an aerial vehicle at a base time and a second heading of the aerial vehicle at an overlay time, in accordance with one or more aspects of the present disclosure. The matrix A is a 2×2 matrix that handles the rotation of the overlaid image coordinates into the base image coordinates. An example of matrix A provided in Equation 2, with dφ provided in Equation 3:

$$A = \begin{bmatrix} \cos(d\varphi) & \sin(d\varphi) \\ -\sin(d\varphi) & \cos(d\varphi) \end{bmatrix} \quad (2)$$

$$d\varphi = Heading_O - Heading_B \quad (3)$$

The variable $Heading_O$ is a heading of the aerial vehicle when the overlay image was captured 162. The variable $Heading_B$ is a heading of the aerial vehicle when the base image was captured 160.

FIG. 10B is a conceptual diagram illustrating a distance between a first location of an aerial vehicle at a base time $(Lat_B, Lon_B)$ and a second location of the aerial vehicle $(Lat_O, Lon_O)$, in accordance with one or more aspects of the present disclosure. The variable T in Equation 1 is a 2×1 matrix that handles the horizontal shift from the overlay image reference point to the base image reference. An example T is provided in Equation 4. Elements dx and dy are provided in Equations 5 and 6.

$$T = \begin{bmatrix} dx \\ dy \end{bmatrix} \quad (4)$$

$$dx = \frac{dR\sin(dBrng - Heading_B)}{pixelSizeNM} \quad (5)$$

$$dy = \frac{dR\cos(dBrng - Heading_B)}{pixelSizeNM} \quad (6)$$

$Lat_O$ and $Lon_O$ are the latitude and longitude of the aerial vehicle (in radians) when the overlay image was captured. Similarly, $Lat_B$ and $Lon_B$ are the latitude and longitude of the aerial vehicle (in radians) when the base image was captured. In this example, all arc-tangents may be four quadrant calculations. The angle dBrng, illustrated in FIG. 10B, is provided in Equation 7.

$$dBrng = \tan^{-1}\left(\frac{\sin(\Delta Lon)\cos(Lat_O)}{\cos(Lat_B)\sin(Lat_O) - \sin(Lat_B)\cos(Lat_O)\cos(\Delta Lon)}\right) \quad (7)$$

$$\Delta Lat = Lat_O - Lat_B \quad (8)$$

$$\Delta Lon = Lon_O - Lon_B \quad (9)$$

The variable dR is provided in Equation 10.

$$dR = \frac{2(Radius_{earth} + Altitude)\tan^{-1}\left(\frac{\sqrt{a}}{\sqrt{1-a}}\right)}{1.852} \quad (10)$$

$$a = \sin^2\left(\frac{\Delta Lat}{2}\right) + \sin^2\left(\frac{\Delta Lon}{2}\right)\cos(Lat_B)\cos(Lat_O) \quad (11)$$

In some examples, $Radius_{earth}$ and Altitude have units of kilometers and dR has units of nautical miles.

Returning to FIG. 2, once the current and previous time step cell masks have a common frame of reference, processor 26 performs a track hypothesis creation (70). Processor 26, implementing cell tracking engine 36, overlays cell masks from a previous data frame to cells in a current frame. The cell masks allow for cells to be tracked as a single cell tracks, multi-cell track groups, or to merge tracks into one track history if two or more cells combine into one larger storm cell. Cell masks offer a native robustness over the centroid proximity or shape matching algorithms used by other proposed tracking systems or tracking algorithms used for objects with a relatively fixed shape, size, and form. The cell mask technique described herein allows processor 26 to form and maintain storm cell track histories when cells split or merge as they often do simply as a result of the turbulent nature of weather and the less than 100% probability of detection (Pd) of detection and ranging system 20. Processor 26 uses the overlapping areas, if any, between the two data frames to generate track hypotheses.

For a track hypothesis, processor 26 forms a track when it links a cell from the current data frame to a cell in the previous data frame, which is tracking the weather cell over time. In order to generate the track hypothesis, processor 26 counts overlapping pixels in segmented features maps from a current time step cell mask to a previous time step cell mask. Processor 26 counts the overlapping pixels by overlapping the two time step cell masks, such that the same reference frame has both the previous and current time step cell masks. Example changes to cell structure from one time frame to another include single cell overlaps, multi-cell merges, and single cell fracturing. Systems using techniques described herein can track these weather cell changes.

For example, in one case, there may be five different cells in the first data frame and six in the next data frame. Cell 2 in the first data frame may split into two cells in the next, second data frame such that they appear to be two convective cells next to each other. In the second data frame, these two cells are labeled 4 and 5. When processor 26 performs the overlap, it correlates cell 2 from the first data frame with both cells 4 and 5 in the second data frame. Depending on how much overlap there is, processor 26 may identify cells 4 and 5 as a new multi-cell (e.g., it was 2 and now it is multi-cell 4 and 5). This is one example of processor 26 making a hypothesis of which cells correlate over time to be a single weather cell entity. In some examples, processor 26 only looks at frames that are adjacent in time to determine the cell track hypothesis.

In yet other examples, processor 26 may look at data frames that are not adjacent in time. This may be useful for instances in which a weather cell disappears for a number of scans (possibly due to rain shadowing obscuring the view of detection and ranging system 20). Otherwise, processor 26 may delete this cell track and restart tracking it when the cell re-appears.

Returning to FIG. 2, processor 26 updates the track histories with the most likely track hypothesis (72). Processor 26 may create new tracks if necessary. For example, once processor 26 determines how much overlap there is for each cell combination between the current frame and the previous frame, processor 26 may choose the most likely result (e.g., multi-cell merging occurred, single cell fracturing occurred, or any combination thereof). This is the updated track history. In some examples, processor 26 stores the updated track history in memory 24 or tracking database 42. Processor 26 may use the amount of overlap to determine which track is most likely. Processor 26 may apply an adaptive threshold based on how much overlap there is between cells in order to determine the hypothesis, e.g., whether a detected convective weather cell remained a single cell or split into multiple cells, or to determine whether a multi-cell merged with another multi-cell or a single cell.

Figure 11A:
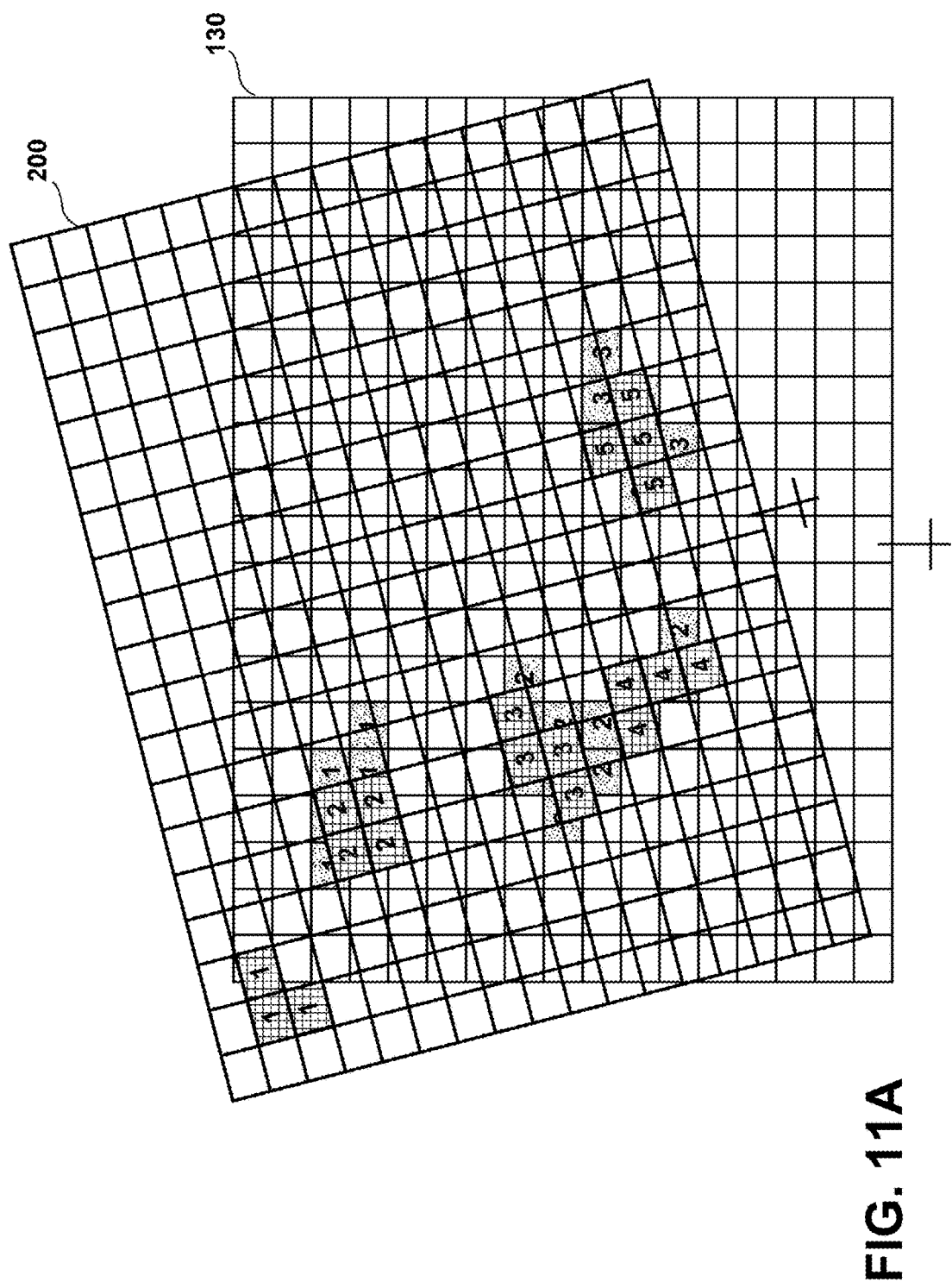
FIGS. 11A and 11B are diagrams illustrating an example time step cell mask overlay for track hypothesis creation, in accordance with one or more aspects of the present disclosure.
Figure 11B:
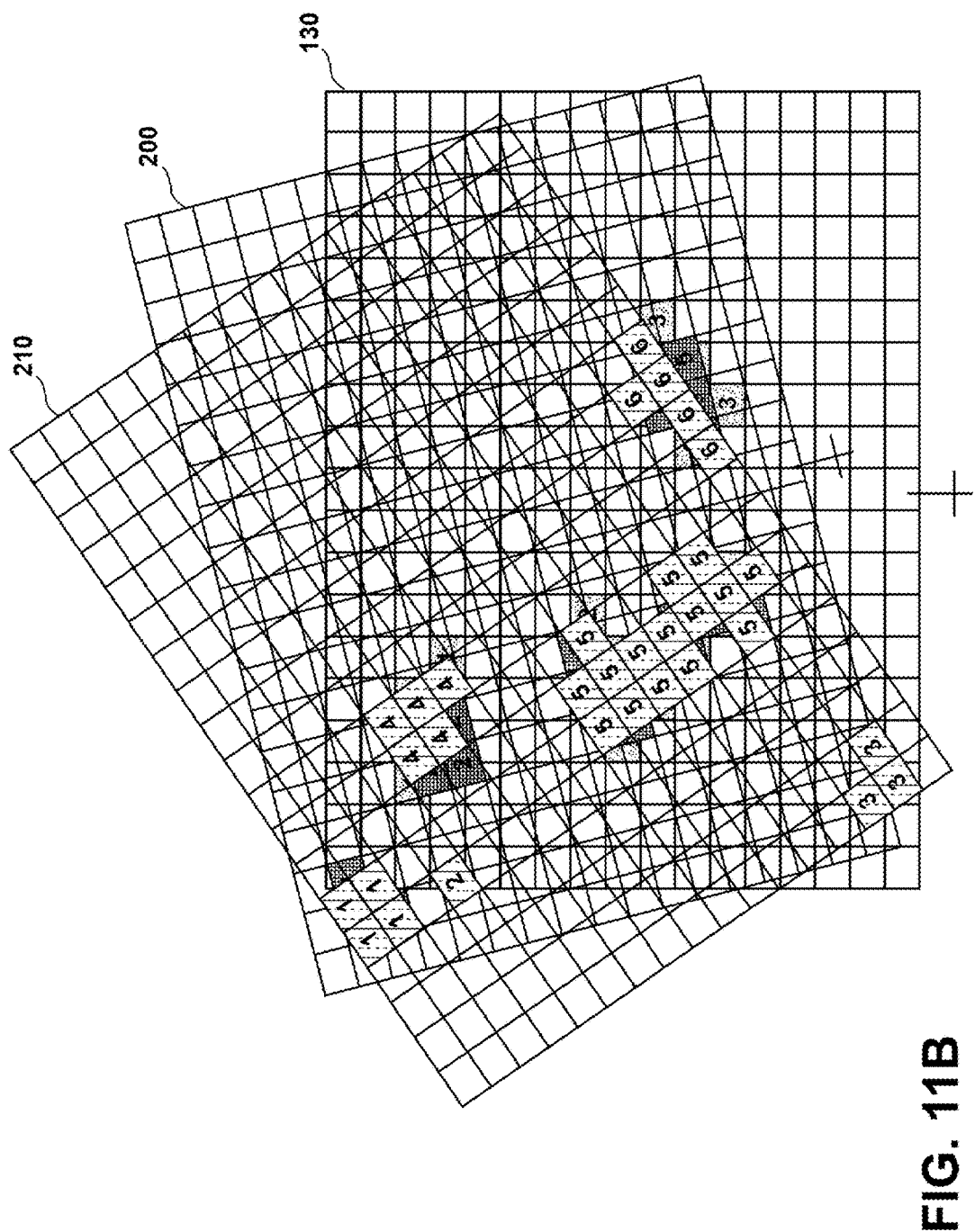

An example of overlaying multiple time step cell masks is provided in FIGS. 11A and 11B. FIGS. 11A and 11B are diagrams illustrating an example time step cell mask overlay for track hypothesis creation, in accordance with one or more aspects of the present disclosure. Starting with the cell mask example of FIG. 8A, FIG. 11A illustrates a second time step cell mask 200 overlaid onto the cell mask 130 of FIG. 8A. As shown, processor 26 has rotated cell mask 200 by an angle relative to cell mask 130, which is based on the movement of the aerial vehicle between the first time (when the reflectivity data for the first segmented feature map was collected) to the second time (when the reflectivity data for the second segmented feature map was collected). Processor 26 rotated cell mask 200 in order to translate the two segmented feature maps to a common frame of reference.

Table 1 provides an example showing track identifications of the cells in FIG. 11A, whether it is a multi-cell track, a current cell ID, and previous cell ID. Processor 26 may generate the track identifications, which correspond to respective tracks of detected convective weather cells.

TABLE 1

| Track ID | Multi-track | Current Cell ID | Previous Cell ID |
|---|---|---|---|
| 1 | No | 2 | 1 |
| 2 | Yes | 3, 4 | 2 |
| 3 | No | 5 | 3 |
| 4 | No | 1 | N/A |
| 5 | No | 3 | N/A |
| 6 | No | 4 | N/A |

FIG. 11B illustrates a third time step cell mask 210 overlaid onto the cell mask 200 of FIG. 11A and the cell mask 130 of FIG. 8A. Table 2 provides details for the changes in the cell tracks between the different time steps. Again, processor 26 may generate the track identifications. The current cell ID column includes the cell identification number for the third time, the previous cell ID column includes the cell identification number for the second time, and the Z-2 cell ID column includes the cell identification number for the first time.

TABLE 2

| Track ID | Multi-track | Current Cell ID | Previous Cell ID | Z-2 Cell ID |
|---|---|---|---|---|
| 1 | No | 4 | 2 | 1 |
| 2 | No | 5 | 3, 4 | 2 |
| 3 | No | 6 | 5 | 3 |
| 4 | No | 1 | 1 | N/A |
| 5 | No | N/A | 3 | N/A |
| 6 | No | N/A | 4 | N/A |
| 7 | No | 2 | N/A | N/A |
| 8 | No | 3 | N/A | N/A |

As illustrated in FIG. 11B and Table 2, previous cell ID 2 is now current cell ID 4, which was originally cell ID 1 (in cell mask 130). Previous cell IDs 3 and 4 are now cell 5, which was originally cell ID 2. Previous cell ID 5 is now cell ID 6, which was originally cell ID 3. Current cell ID 1 was previous cell ID 1 and did not exist in cell mask 130. Likewise, current cell ID 2 and 3 did not exist in either the previous cell mask 200 or cell mask 130.

Thus, using the techniques described above, processor 26 may updates the track histories, including creating new tracks, based on overlap between tracks among different time steps.

Returning to FIG. 2, processor 26 may trim expired tracks in some examples (74). In some examples, processor 26 trims these tracks from a hypothesis pool. For example, if a track has not refreshed within a given number of time frames, then processor 26 deletes that track. This may be, for example, if a convective cell dissipates or leaves the field of view of detection and ranging system 20. Example rules that processor 26 may follow when formulating the track hypothesis may be as follows.

For example, if a given track has not been correlated with a cell in the current frame, then processor 26 trims that track. In some examples, processor 26 trimming an uncorrelated track implies that processor 26 has not correlated the track with a current cell for N frames before trimming it. However, in some cases, this increases the complexity of keeping track of the most current cell location for a given track overlapping future cells (i.e., keeping cell masks when necessary).

In another example, if two single cell tracks share the same cell in the current frame, then processor 26 trims the track with the weaker cell history. For example, a weaker cell-history means that the cell has a cell history that doesn't extend back as many frames as a cell with a stronger history. In an alternative example, a weaker cell-history may mean velocity or position trend of one of the tracks has a lower variance between measurements.

In another example, if all but one of the cells in a multi-cell track are associated with a single cell track that has sufficient history, then processor 26 transforms the multi-cell track into a single cell track. In this example, processor 26 may remove the track histories associated with the cells that previously belonged to the track from a new single cell track history and processor 26 recalculates any trending values.

For example, briefly turning to FIG. 11B, processor 26 may trim tracks 5 and 6 because track 2 has a stronger track history. In one example, a given current frame cell can only belong to one single cell track at a given time.

Thus, allowing for cells to transition from single cells, to a merged cell, to multi-cell tracks and all permutations allows the cell track history to remain intact for weather structures that are in strong spatial correlation within neighboring data frames (e.g., time samples). This may allow for higher quality trend estimates for storm characteristics of interest such as speed, direction, and growth rate.

Returning to FIG. 2, the process may include building a display based on the tracked cells (76). The display may provide tracking of weather cells in the atmosphere surrounding the aerial vehicle. For example, processor 26, implementing output generating engine 38, may build a display based on cell track information. In further examples, processor 26 does not build a display.

In some examples, the described convective cell identification and tracking techniques, devices, and systems may run on the back end of detection and ranging system 20, such as a radar system, which has processed reflectivity into VIR/VIL or pulls relatively recent historical VIR/VIL data from a tracking database. The techniques result in an output of cell track histories over time (such as storm cell centroid coordinates, storm cell mass, as well as any VIR or reflectivity characteristics that are desired over time such as maximum reflectivity, height of the 45 dBz contour (probability of hail), radar echo cell top, and the like. A processor, such as processor 26, may apply filters to these radar outputs to provide appropriately conditioned information for use on a human user interface (e.g., weather radar display), a navigational or traffic routing system, an automated geographical weather warning system, or a system providing training and test data sets for a storm prediction system using atmospheric input (areas of low/high pressure, upper level winds, temperature gradients, other) measured by other systems to predict cell movement.

The techniques, devices, and systems described herein are able to maintain tracks on convective cells that are splitting and merging and slowly evolving over time without losing the center position of the convective cell. This may allow processor 26, implementing cell tracking engine 36, to track velocity and mass growth of storm cells over time.

Figure 12:
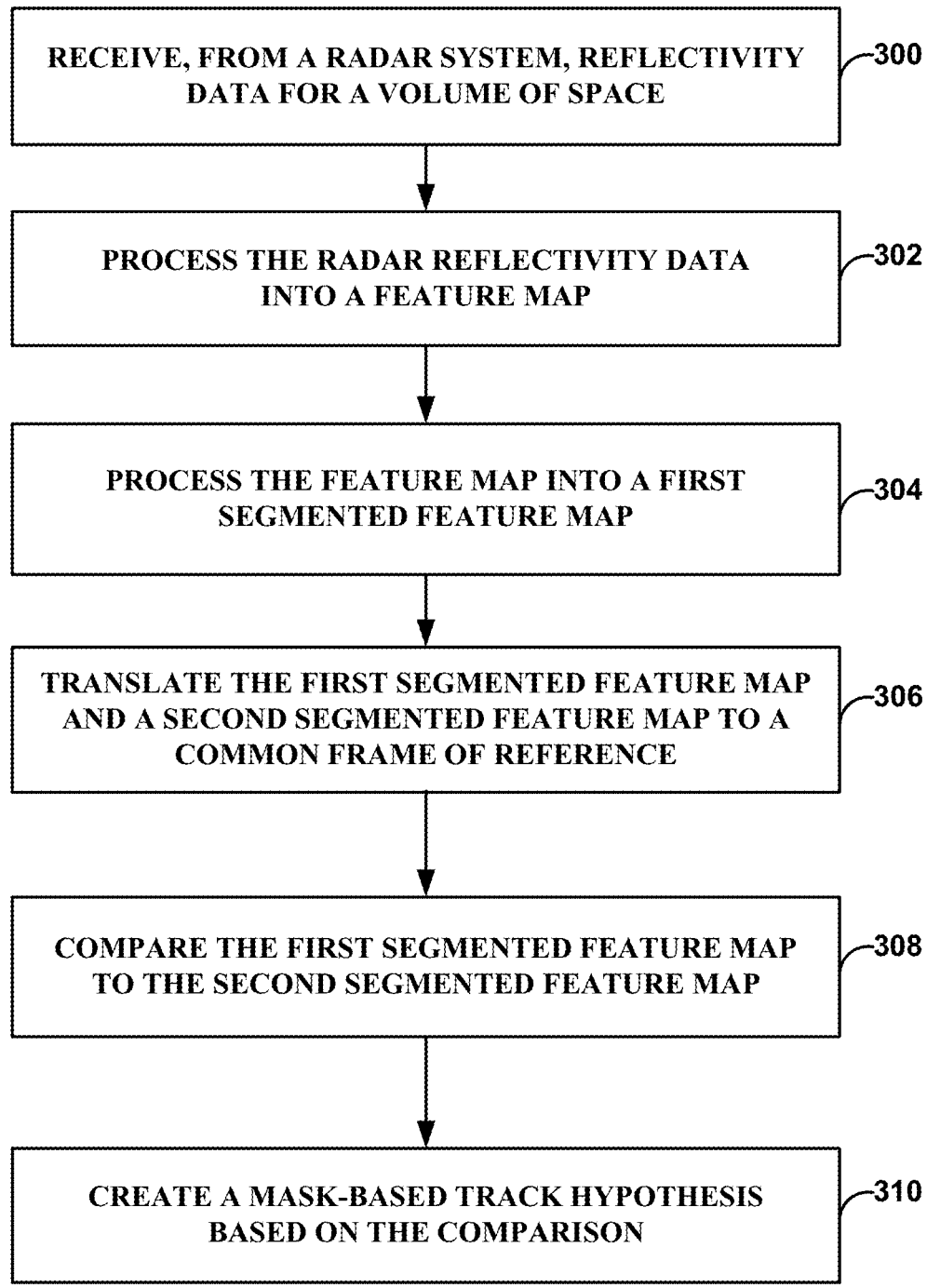
FIG. 12 is a flowchart illustrating an example method of tracking cells, in accordance with one or more aspects of the present disclosure.

FIG. 12 is a flowchart illustrating an example method of tracking cells, in accordance with one or more aspects of the present disclosure. As discussed herein, the method is described with respect to processor 26, implementing cell tracking system 10, of FIG. 1. However, the method may apply to other example surveillance and navigation systems as well. In addition, in other examples, another processor, alone or in combination with processor 26, may perform any part of the technique shown in FIG. 12.

In the technique shown in FIG. 12, processor 26 receives, from a detection and ranging system, reflectivity data for a volume of space (300). For example, detection and ranging system 20 may receive reflectivity data for an atmosphere around an aerial vehicle which houses detection and ranging system 20, and transmit signals indicative of the reflectivity data to processor 26. Detection and ranging system 20 may sample the volume of space at a first time instance, for a current data frame.

Processor 26 processes the reflectivity data into a feature map (302), which can be a two dimensional representation of the volume of space that indicates the reflectivity data in some examples. Processor 26 may, for example, build a classified feature map based on the reflectivity data and apply a classification threshold to the reflectivity data to identify convective cells.

In some examples, processor 26 generates a feature map. Generating the classified feature map may include building a vertically integrated reflectivity feature map based on the reflectivity data, generating a classified feature map based on applying a threshold to the vertically integrated reflectivity feature map, and conditioning the classified feature map using one or more of filter smoothing and shape generalization. In some examples, generating the first segmented feature map further includes processor 26 applying a reflectivity threshold to the reflectivity data to identify convective cells.

In further examples, in order to process the reflectivity data into a feature map, processor 26 may condition the classified feature map using one or more filters for smoothing and shape generalization. For example, processor 26 may apply a morphological filter to the reflectivity data. As another example, processor 26 may apply the morphological filter to the thresholded feature map sparsely.

The time instance that the reflectivity data is gathered may be a current time instance. Detection and ranging system 20 may have received reflectivity data at a previous time instance that precedes the current time instance. Processor 26 may process the classified feature map into a current segmented feature map (304). For example, processor 26 may systematically process a classified feature map to partition cells from one another. Each cell may include one or more pixels. The segmented feature map may, for example, identify separate objects and their spatial extent as individual entities to be tracked.

Processor 26 translates the current segmented feature map and a previous segmented feature map to a common frame of reference (306). Processor 26 may, for example, translate the coordinates of the current segmented feature map to frame of reference of the previous segmented feature map. As a result of the common reference frame, processor 26 may overlay the cells of the current segmented feature map onto the cells of the previous segmented feature map. The current and previous segmented feature maps may correspond to first and second segmented feature maps that are generated from data collected at different points in time, as well as possibly at different points in space.

In the technique shown in FIG. 12, processor 26 compares the current segmented feature map to the previous segmented feature map (308). Processor 26 may compare the current segmented feature map to the previous segmented feature map to determine which cells between the two data frames spatially correlate with one another, preparing processor 26 to create a track hypothesis based on the spatial comparison of the current segmented feature map to the previous segmented feature map (310). Processor 26 may form the track hypothesis based the established spatial correlation between cells in different data frames, e.g., by processor 26 by determining an amount of overlap for each identified convective cell between the current segmented feature map and the previous segmented feature map. Processor 26 may also select a most likely track or trim unlikely track hypotheses based on how much overlap is present. Other metrics may be used in determining if a hypothesis should survive to the next iteration of the tracking method, such as the quality of a resulting velocity vector, a consistency in a mass of the cell from one frame to another, as well as other metrics.

In addition, processor 26 may identify one or more convective cells in the current segmented feature map to track. As discussed above, processor 26 may create a track history, or update an existing one, based on comparing the one or more convective cells in the current segmented feature map to one or more convective cells in the previous segmented feature map. Creating a cell mask for each of the one or more convective cells in the current segmented feature map may further include processor 26 overlaying the cell masks from the current segmented feature map on cell masks from the previous segmented feature map, generating a track hypothesis based on a comparison of the cell masks from the current segmented feature map to cell masks from the previous segmented feature map, and storing the track history for each of the one or more cell mask as one of a single cell track or a multi-cell track.

In some examples, processor 26 may create a track hypothesis pool including tracks for each identified convective cell and trim expired tracks from the track hypothesis pool.

In additional examples, processor 26, implementing cell tracking engine 36 or output generating engine 38, creates an image based on the track hypothesis. In some examples, the image conveys to, a pilot, for example, the results of the tracking techniques described herein. In other examples, output generating engine 38 suppresses or alters the display of reflectivity that has not established a stable track. A display device, such as display device 40, may output the image. In some examples, the image is of convective cells in the atmosphere at least partially surrounding detection and ranging system 20. Processor 26 can also include other features in the image, such as one or more of a graphical representation of the aircraft or other airborne vehicle on which detection and ranging system 20 is mounted, ground features, other aircraft, and the like. In other examples, system 10 provides output that is not a display, such as the sending tracking information to a control system that routes traffic or integrates tracks between several platforms based on the tracking data.

In another example, a system comprised of one or more detectors remotely or directly samples a spatial environment periodically. The one or more detectors may be a single detector or a distributed set of detectors. The one or more detectors scan for the presence of an object, constituent, or constituents of an object or collection of objects. The one or more detectors may be communicatively coupled (e.g., wired or wirelessly) to a processing unit that assembles the various samples and stores them in a spatially indexed buffer of memory. The memory may be a memory system that stores the samples collected by the one or more detectors and organizes the samples spatially. The one or more detectors may not be co-located, but the samples taken are associated with the spatial location and time that they were taken. Also, the samples that cover the environment need to be taken such that the time to sample the environment is significantly smaller than the time it takes for the objects or groups of objects in the environment to change their locations.

The one or more processing units, such as processor 26, may build a feature map from the various types of detections available in the memory, such as memory 24, to evaluate the spatial extent and to what degree an object or group of objects of interest exist. The one or more processing units applies a classification threshold to the feature map to identify in which pixels of the spatially sampled map the object or group of objects is deemed to exist. The one or more processing units applies a morphological filter or combination of filters to the classified feature map to simplify the detected boundaries of any existing object or group of objects.

The one or more processing units segment the conditioned and classified feature map into areas where the objects are isolated from one another to identify them as independent objects or cells to be tracked. The one or more processing units store a cell map or cell masks or equivalent data structure that catalogs the spatial extent of each of the individual identified cells into memory, as well as any characteristics or detection values, or statistic of values inside that cell that wish to be trended over time. The one or more processing units spatially register the cell map or masks onto the cell map or masks of a previous time sample and create track hypotheses as to which cells constitute the same object or group between the two time samples.

The one or more processing units stores the track hypotheses in memory as either multi-cell track (e.g., contains multiple cells in the current time sample cell-map/or masks) or single cell tracks (e.g., where the track hypothesis is for a single cell from the cell map/masks in the current time sample). The one or more processing units examine the pool of hypotheses for duplicates or hypotheses that are in conflict and trim them when creating or updating cell-track to maintain the best possible track histories. Where two or more track hypotheses share the exact same constituent cells in the current frame, the hypotheses will be merged such that the resulting cell track has a history that is composed of the superset of the histories of the corresponding cell tracks from the previous time sample. Where two multi-cell track hypotheses share a sub-set of the same constituent cells in the current frame, both hypotheses will be maintained.

A multi-cell hypothesis resulting from a single cell in the previous frame may inherit the single cell's history as its own. A cell in the current time sample not associated with a single-cell track hypothesis may result in the creation of a separate new single cell track with a fresh track history. Cell-tracks that have not been associated with a cell in the current time sample for one or more time samples may be trimmed from memory. The one or more processing units may remove single cell tracks with track histories of sufficient length as constituents from multi-cell tracks. The one or more processors may remove appropriate portions of the track history corresponding to the removed single cell track.

The one or more processing units may use the track histories of the determined cell tracks to trend or estimate cell parameters (such as velocity, change in mass, change in echo-top height, etc. . . . ) of the cells over time and the stability of parameters or the rates of change. The one or more processing units may extrapolate the trends to predict what the cell's parameters might be in the future.

The one or more processing units may communicate the results of the tracking and trending on to a display system for interpretation by a user, such as a pilot or air traffic control. The one or more processing units may communicate the results of the tracking and trending to an external system making higher level decisions in response to cell movement or change. The one or more processing units may store the tracking and trending data into memory to be recalled later. The one or more processing units may mark cells with little to no cell-track history as possibly being the result of noise.

The term "about," "approximate," or the like indicates that the value listed may be somewhat altered, as long as the alteration does not result in nonconformance of the process or structure to the illustrated example.

In one or more examples, some of the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "signal processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Various aspects of the disclosure have been described. Aspects or features of examples described herein may be combined with any other aspect or feature described in another example. These and other examples are within the scope of the following claims.

What is claimed is:

1. A method comprising:
    receiving, by a processor and from a detection and ranging system, reflectivity data sampled for a volume of space;
    generating, by the processor, a feature map based on the reflectivity data, wherein the feature map is a representation of the volume of space that indicates the spatial extent of objects to be tracked;
    generating, by the processor, a first segmented feature map based on the feature map;
    translating, by the processor, the first segmented feature map and a second segmented feature map to a common frame of reference;
    identifying, by the processor, one or more weather cells in the first segmented feature map, wherein each weather cell of the one or more weather cells corresponds to an area sampled with the detection and ranging system that has a VIR higher than a classification threshold;
    creating, by the processor, a cell mask for a weather cell of the one or more weather cells in the first segmented feature map;
    overlaying, by the processor, the cell mask from the first segmented feature map on one or more cell masks from the second segmented feature map; and
    generating, by the processor, a track hypothesis based on a comparison of the cell mask from the first segmented feature map to the one or more cell masks from the second segmented feature map.

2. The method of claim 1, further comprising:
    creating, by the processor, a track history based on comparing the one or more weather cells in the first segmented feature map to one or more weather cells in the second segmented feature map, wherein the track hypothesis is further based on the track history; and
    storing the track history for each of the one or more cell mask as one of a single cell track or a multi-cell track.

3. The method of claim 2, further comprising updating the track history based on a most likely track hypothesis.

4. The method of claim 3, wherein updating the track history based on a most likely track hypothesis comprises:
    determining an amount of overlap for each identified weather cell between the first segmented feature map and the second segmented feature map; and
    selecting the most likely track based on the weather cells with the highest amount of overlap.

5. The method of claim 1, wherein generating the feature map comprises:
    building a vertically integrated reflectivity feature map based on the reflectivity data;
    generating a classified feature map based on applying a classification threshold to the vertically integrated reflectivity feature map; and
    conditioning the classified feature map using one or more of a smoothing filter and a shape generalization filter.

6. The method of claim 5, wherein conditioning the classified feature map comprises sparsely applying a morphological filter to the classified feature map.

7. The method of claim 1, wherein generating the first segmented feature map comprises applying a classification threshold to the reflectivity data to identify weather cells.

8. The method of claim 7, wherein creating the track hypothesis based on the comparison of the first segmented feature map and the second segmented feature map comprises creating a track hypothesis pool including one or more tracks for each identified weather cell, the method further comprising trimming expired tracks from the track hypothesis pool.

9. The method of claim 1, wherein the reflectivity data is gathered at a first time instance, the second segmented feature map is based on reflectivity data gathered at a second time instance, and the second time instance precedes the first time instance.

10. The method of claim 1, wherein the first segmented feature map includes a map of weighted centroid locations for each weather cell of the one or more weather cells, and wherein generating the track comparison is further based on a comparison of the weighted centroid locations in the first segmented feature map to weighted centroid locations in the second segmented feature map.

11. A system comprising:
a detection and ranging system configured to receive reflectivity data; and
one or more processors communicatively coupled to the detection and ranging system, wherein the one or more processors are configured to:
- receive, from the detection and ranging system, the reflectivity data sampled for a volume of space;
- build a vertically integrated reflectivity feature map based on the reflectivity data, wherein the vertically integrated reflectivity feature map includes one or more weather cells and a representation of the volume of space that indicates spatial extent of weather to be tracked;
- generate a first classified feature map based on applying a classification threshold to the vertically integrated reflectivity feature map;
- condition the first classified feature map by sparsely applying a morphological filter to the classified feature map;
- translate the first classified feature map and a second classified feature map to a common frame of reference;
- compare the first classified feature map to the second classified feature map; and
- create a track hypothesis based on a comparison of the one or more weather cells in the first classified feature map to one or more weather cells in the second classified feature map.

12. The system of claim 11, wherein the one or more processors are further configured to:
- identify one or more weather cells in the first classified feature map, wherein each weather cell corresponds to an area sampled with the detection and ranging system that has a reflectivity higher than a classification threshold; and
- create a track history based on comparing the one or more weather cells in the first classified feature map to one or more weather cells in the second classified feature map, wherein the track hypothesis is further based on the track history.

13. The system of claim 12, wherein the one or more processors are further configured to create a cell mask for each of the one or more weather cells in the first classified feature map, and wherein to create the track history, the one or more processors are further configured to:
- overlay the cell masks from the first classified feature map on cell masks from the second classified feature map;
- generate a track hypothesis based on a comparison of the cell masks from the first classified feature map to cell masks from the second classified feature map; and
- store the track history for each of the one or more cell mask as one of a single cell track or a multi-cell track.

14. The system of claim 13, wherein the one or more processors are further configured to:
- update the track history based on a most likely track hypothesis, wherein to update the track history based on a most likely track hypothesis the one or more processors are further configured to:
  - determine an amount of overlap for each identified weather cell between the first classified feature map and the second classified feature map; and
  - select a most likely track based on the weather cells with the highest amount of overlap.

15. The system of claim 11, wherein the first classified feature map includes a map of weighted centroid locations for each weather cell of the one or more weather cells, and wherein the one or more processors are configured to create the track comparison based on a comparison of the weighted centroid locations in the first classified feature map to one or more weighted centroid locations in the second classified feature map.

16. The system of claim 11, wherein to process the feature map into a first segmented feature map, the one or more processors are further configured to apply a classification threshold to the reflectivity data to identify weather cells.

17. The system of claim 16, wherein to create the track hypothesis, the one or more processors are configured to:
- create a track hypothesis pool including tracks for each identified weather cell, and
- trim expired tracks from the track hypothesis pool.

18. A computer-readable storage medium having stored thereon instructions that, when executed, cause a processor to:
- receive, from a detection and ranging system, reflectivity data sampled for a volume of space;
- process the reflectivity data into a feature map, wherein the feature map is a representation of the volume of space that indicates the weather to be tracked;
- apply a threshold to the feature map to identify one or more weather cells in the feature map;
- segment the feature map into a first segmented feature map including one or more weather cells;
- create a cell mask for each of the one or more weather cells in the first segmented feature map;
- translate the first segmented feature map and a second segmented feature map to a common frame of reference;
- overlay the cell masks from the first segmented feature map on cell masks from a second segmented feature map;
- compare the first segmented feature map to the second segmented feature map;
- generate a track hypothesis based on the comparison of the cell masks from the first segmented feature map to cell masks from the second segmented feature map;
- store the track history for some of the one or more cell masks; and
- trim the track history of some of the one or more cell masks that are expired.

19. The computer-readable storage medium of claim 18, wherein the instructions, when executed, further cause the processor to:
- update the track history based on a most likely track hypothesis, wherein updating the track history based on a most likely track hypothesis comprises:
  - determining an amount of overlap for each identified weather cell between the first segmented feature map and the second segmented feature map; and
  - selecting a most likely track based on the weather cells with the highest amount of overlap.

* * * * *